(12) United States Patent
Furuichi et al.

(10) Patent No.: US 11,669,071 B2
(45) Date of Patent: Jun. 6, 2023

(54) ORGANIZING A TEMPORARY DEVICE GROUP FOR COLLABORATIVE COMPUTING

(71) Applicant: INTERNATIONAL BUSINESS MACHINES CORPORATION, Armonk, NY (US)

(72) Inventors: Sanehiro Furuichi, Tokyo (JP); Akiro Saito, Ichikawa (JP); Hayato Uenohara, Funabashi (JP); Satoshi Yokoyama, Ichikawa (JP); Gaku Yamamoto, Tokyo (JP); Norie Iwasaki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/737,425

(22) Filed: Jan. 8, 2020

(65) Prior Publication Data
US 2021/0208570 A1 Jul. 8, 2021

(51) Int. Cl.
*G05B 19/4155* (2006.01)
*H04L 67/104* (2022.01)

(52) U.S. Cl.
CPC ...... *G05B 19/4155* (2013.01); *H04L 67/1044* (2013.01); *G05B 2219/31103* (2013.01)

(58) Field of Classification Search
CPC ............ H04L 67/1044; H04L 67/1046; H04L 67/1048; H04L 67/1061; H04L 67/1063;
(Continued)

(56) References Cited

U.S. PATENT DOCUMENTS 8,156,127 B1    4/2012  Lee
8,948,144 B1*   2/2015  Issa .................... H04W 76/14
                                                455/414.3
(Continued)

FOREIGN PATENT DOCUMENTS

CN      110602643 A    12/2019
JP      2008299676 A   12/2008
(Continued)

OTHER PUBLICATIONS

Shehory, Onn, and Sarit Kraus. "Methods for task allocation via agent coalition formation." Artificial intelligence 101.1-2 (1998): 165-200. (Year: 1998).*

(Continued)

*Primary Examiner* — Vivek Srivastava
*Assistant Examiner* — William C McBeth
(74) *Attorney, Agent, or Firm* — Nathan M. Rau

(57) ABSTRACT

Provided are techniques for organizing a temporary device group for collaborative computing. A list of functions for each of a plurality of devices are stored. A determination is made to form a device group including a receiver device from the plurality of devices, where the receiver device will perform one of the functions. An individual function usage score is generated. In response to the individual function usage score exceeding a device threshold, a request to form a device group is sent to the receiver device. In response to receiving an indication of acceptance to form the device group from the receiving device, the device group is formed for a temporary period, where functions and data are shared in the device group.

17 Claims, 19 Drawing Sheets

(58) Field of Classification Search
CPC . H04L 67/1068; H04L 67/1072; H04L 67/12; H04L 67/16; H04L 67/104; H04L 67/1042; H04L 67/1093; H04L 67/51; H04L 67/1059; H04W 4/30; H04W 4/38; H04W 84/18

See application file for complete search history.

(56) References Cited

U.S. PATENT DOCUMENTS

| | | | |
|---|---|---|---|
| 9,922,565 B2 | 3/2018 | Thomas et al. | |
| 10,181,985 B1* | 1/2019 | Passaglia | H04L 67/1061 |
| 10,518,729 B2 | 12/2019 | Kumar | |
| 10,559,196 B2 | 2/2020 | Matus | |
| 2003/0204625 A1* | 10/2003 | Cain | H04L 45/46 709/243 |
| 2004/0186897 A1* | 9/2004 | Knauerhase | H04L 67/51 709/209 |
| 2004/0189831 A1 | 9/2004 | Shibatani | |
| 2007/0087756 A1* | 4/2007 | Hoffberg | G06Q 20/065 455/450 |
| 2009/0179775 A1 | 7/2009 | Bos | |
| 2011/0258313 A1* | 10/2011 | Mallik | H04L 67/1068 709/224 |
| 2012/0282934 A1* | 11/2012 | Simonsson | H04B 7/024 455/446 |
| 2014/0080481 A1* | 3/2014 | Abraham | H04W 8/005 455/434 |
| 2014/0081505 A1 | 3/2014 | Klinger | |
| 2014/0223019 A1* | 8/2014 | McCann | H04L 9/40 709/228 |
| 2014/0258395 A1* | 9/2014 | Tng | H04L 67/51 709/204 |
| 2015/0109961 A1* | 4/2015 | Patil | H04W 72/005 370/254 |
| 2015/0134743 A1 | 5/2015 | Heo | |
| 2015/0154871 A1 | 6/2015 | Rothoff | |
| 2017/0041419 A1 | 2/2017 | Zhong | |
| 2017/0084175 A1 | 3/2017 | Sedlik | |
| 2017/0150337 A1* | 5/2017 | Bareket | H04L 67/104 |
| 2017/0195426 A1* | 7/2017 | Tanaka | H04W 12/086 |
| 2017/0243504 A1 | 8/2017 | Hada | |
| 2017/0287233 A1 | 10/2017 | Nix | |
| 2018/0059684 A1* | 3/2018 | Hadfield | G05D 1/0287 |
| 2018/0075309 A1 | 3/2018 | Sathyanarayana | |
| 2018/0077518 A1 | 3/2018 | Nguyen | |
| 2018/0121763 A1 | 5/2018 | Sumilla et al. | |
| 2018/0144640 A1 | 5/2018 | Price et al. | |
| 2018/0302424 A1* | 10/2018 | Bender | H04L 67/10 |
| 2018/0345963 A1 | 12/2018 | Maura | |
| 2019/0064913 A1 | 2/2019 | O'Brien et al. | |
| 2019/0122561 A1 | 4/2019 | Shimizu | |
| 2019/0289469 A1* | 9/2019 | Bentley | H04W 16/10 |
| 2020/0096360 A1 | 3/2020 | Pfeifle | |
| 2020/0282549 A1 | 9/2020 | Torii | |
| 2021/0049599 A1* | 2/2021 | Ghafourifar | H04L 67/1042 |
| 2021/0058487 A1* | 2/2021 | Park | H04L 67/51 |
| 2021/0286655 A1* | 9/2021 | Liu | H04L 67/10 |

FOREIGN PATENT DOCUMENTS

| | | |
|---|---|---|
| JP | 2017188035 A | 10/2017 |
| JP | 2018508874 | 3/2018 |
| WO | 9948073 W | 9/1999 |
| WO | 2017037845 A1 | 3/2017 |

OTHER PUBLICATIONS

He, Linli, and Thomas R. Ioerger. "Forming resource-sharing coalitions: a distributed resource allocation mechanism for self-interested agents in computational grids." Proceedings of the 2005 ACM symposium on Applied computing. 2005. (Year: 2005).*

Penner, Terry, et al. "Transient clouds: Assignment and collaborative execution of tasks on mobile devices." 2014 IEEE Global Communications Conference. IEEE, 2014. (Year: 2014).*

Yu, Rong, et al. "Cooperative resource management in cloud-enabled vehicular networks." IEEE Transactions on Industrial Electronics 62.12 (2015): 7938-7951. (Year: 2015).*

Behzadan, Vahid, and Banafsheh Rekabdar. "A game-theoretic model for analysis and design of self-organization mechanisms in iot." International Conference on Game Theory for Networks. Springer, Cham, 2017. (Year: 2017).*

Pal, Sujata, Barun Kumar Saha, and Sudip Misra. "Game theoretic analysis of cooperative message forwarding in opportunistic mobile networks." IEEE transactions on Cybernetics 47.12 (2017): 4463-4474. (Year: 2017).*

Tsiropoulou, Eirini Eleni, Surya Teja Paruchuri, and John S. Baras. "Interest, energy and physical-aware coalition formation and resource allocation in smart IoT applications." 2017 51st Annual Conference on Information Sciences and Systems (CISS). IEEE, 2017. (Year: 2017).*

Ray, Benay Kumar, Sunirmal Khatua, and Sarbani Roy. "A game theoretic model for cloud federation." Cloud Computing for Optimization: Foundations, Applications, and Challenges. Springer, Cham, 2018. 73-97. (Year: 2018).*

Saad, Walid, et al. "A selfish approach to coalition formation among unmanned air vehicles in wireless networks." 2009 International Conference on Game Theory for Networks. IEEE, 2009. (Year: 2009).*

Nehra, Neeraj, R. B. Patel, and Vijay Kumar Bhat. "MASD: Mobile agent based service discovery in ad hoc networks." International Conference on High-Performance Computing. Springer, Berlin, Heidelberg, 2007. (Year: 2007).*

Tošić, Predrag T., and Carlos Ordonez. "Distributed protocols for multi-agent coalition formation: a negotiation perspective." International Conference on Active Media Technology. Springer, Berlin, Heidelberg, 2012. (Year: 2012).*

Ververidis, Christopher N., and George C. Polyzos. "Service discovery for mobile ad hoc networks: a survey of issues and techniques." IEEE Communications Surveys & Tutorials 10.3 (2008): 30-45. (Year: 2008).*

Ward, E., "Models Supporting Trajectory Planning in Autonomous Vehicles," Doctoral Thesis, 2018, 64 pages.

"N-version programming," Wikipedia, last edited Feb. 10, 2018, 2 pages. https://en.wikipedia.org/w/index.php?title=N-version_programming&oldid=824933441.

List of IBM Patents or Patent Applications Treated as Related, Signed Mar. 3, 2020, 2 pages.

K. Wang et al., "Enabling Collaborative Edge Computing for Software Defined Vehicular Networks", IEEE Network • Sep./Oct. 2018, pp. 6.

I. Farris et al., "MIFaaS: a Mobile-IoT-Federation-as-a-Service Model for Dynamic Cooperation of IoT Cloud Providers", Preprint submitted to Future Generation Computer Systems: SI on Mobile Edge Computing Jun. 24, 2016, pp. 30.

L. Chen et al., "Socially Trusted Collaborative Edge Computing in Ultra Dense Networks", SEC '17, Proceedings of the Second ACM/IEEE Symposium on Edge Computing, San Jose / Silicon Valley, CA, USA 2017 ACM, pp. 11.

"Development and Examination of the application of electronically coupled truck convoys on highways", KONVOI, [online][retrieved https://connectedautomateddriving.eu/project/konvoi/], retrieved Nov. 25, 2019.

K. Katayama et al., "Evacuation Guidance Support Using Cooperative Agent-based IoT Devices," Proc. of the IEEE 6th Global Conference on Consumer Electronics (GCCE 2017), pp. 98-99, Oct. 2017.

Mell, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grange, "The NIST Definition of Cloud Computing (Draft)", Sep. 2011, Computer Security Division Information Technology Laboratory National Institute of Standards and Technology, Total 7 pp.

(56) References Cited

OTHER PUBLICATIONS

International Search Report and Written Opinion, PCT/IB2020/062046, dated Mar. 23, 2021.
U.S. Appl. No. 16/410,779, filed May 13, 2019, Total 47 pp.

* cited by examiner

US 11,669,071 B2

ORGANIZING A TEMPORARY DEVICE GROUP FOR COLLABORATIVE COMPUTING

BACKGROUND

Embodiments of the invention relate to organizing a temporary device group for collaborative computing.

The Internet of Things (IoT) may be described as a group of devices that are connected to the Internet and communicate with each other and/or the rest of the internet. Each of the devices typically has electronics and software to enable that device to collect information and communicate information with other devices. For example, a device may have a sensor to receive, as well as, track information. Then, the device may share that information with other devices.

SUMMARY

In accordance with certain embodiments, a computer-implemented method is provided for organizing a temporary device group for collaborative computing. The computer-implemented method comprises operations. A list of functions for each of a plurality of devices are stored. A determination is made to form a device group including a receiver device from the plurality of devices, where the receiver device will perform one of the functions. An individual function usage score is generated. In response to the individual function usage score exceeding a device threshold, a request to form a device group is sent to the receiver device. In response to receiving an indication of acceptance to form the device group from the receiving device, the device group is formed for a temporary period, where functions and data are shared in the device group.

In accordance with other embodiments, a computer program product is provided for organizing a temporary device group for collaborative computing. The computer program product comprises a computer readable storage medium having program code embodied therewith, the program code executable by at least one processor to perform operations. A list of functions for each of a plurality of devices are stored. A determination is made to form a device group including a receiver device from the plurality of devices, where the receiver device will perform one of the functions. An individual function usage score is generated. In response to the individual function usage score exceeding a device threshold, a request to form a device group is sent to the receiver device. In response to receiving an indication of acceptance to form the device group from the receiving device, the device group is formed for a temporary period, where functions and data are shared in the device group.

In accordance with yet other embodiments, a computer system is provided for organizing a temporary device group for collaborative computing. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A list of functions for each of a plurality of devices are stored. A determination is made to form a device group including a receiver device from the plurality of devices, where the receiver device will perform one of the functions. An individual function usage score is generated. In response to the individual function usage score exceeding a device threshold, a request to form a device group is sent to the receiver device. In response to receiving an indication of acceptance to form the device group from the receiving device, the device group is formed for a temporary period, where functions and data are shared in the device group.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1A:
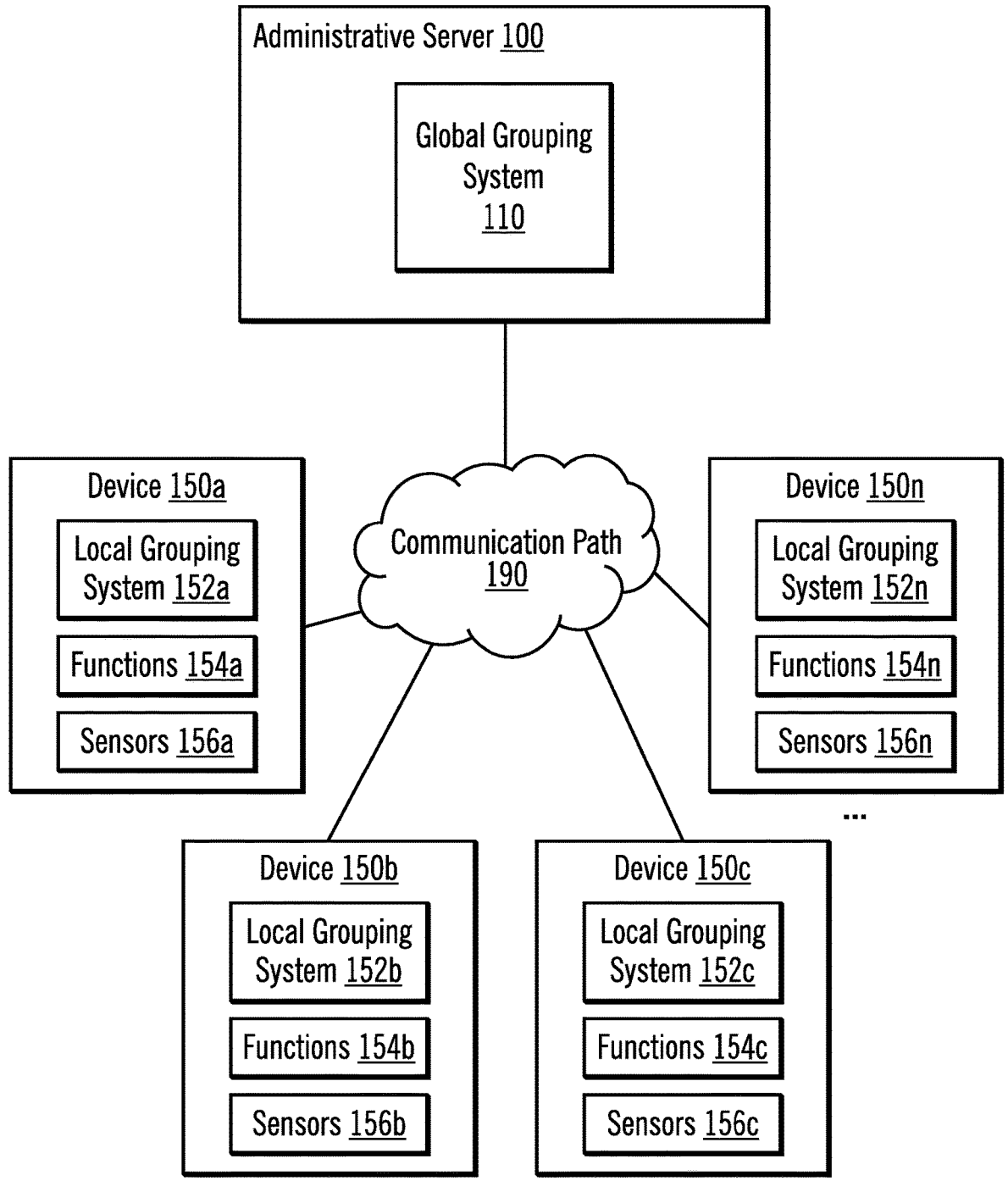
FIG. 1A illustrates, in a block diagram, a computing environment in accordance with certain embodiments.

FIG. 1A illustrates, in a block diagram, a computing environment in accordance with certain embodiments. An administrative server 100 is coupled to devices 150a . . . 150n via a communication path 190 (e.g., an internet, intranet, Radio-Frequency Identification (RFID), etc.). With various embodiments, there may be two or more devices. The administrative server 100 includes a global grouping system 110. Each of the devices 150a . . . 150n includes a local grouping system 152a . . . 152n, local functions 154a . . . 154n, and sensors 156a . . . 156n. Local functions 154a . . . 154n of a device describe functions that the device is able to execute. The sensors 156a . . . 156n receive and track information. In other embodiments, the sensors are separate from the devices 150a . . . 150n, and the devices 150a . . . 150n receive information from the sensors (e.g., sensors on buildings, traffic lights, etc.). The devices 150a . . . 150n may be mobile devices (e.g., in vehicles). A device 150a . . . 150n that receives a request to provide a function 154a . . . 154n may be referred to as a "receiver" device. A device 150a . . . 150n that sends a request for a function 154a . . . 154n may be referred to as a "sender" device. Any device 150a . . . 150n may be a receiver device, a sender device or both a receiver and a sender device. Examples of functions 154a . . . 154n in a vehicle may include providing camera images from a camera of a peripheral environment. A device 150a . . . 150n that is physically close to another device 150a . . . 150n may be referred to as a neighboring device or as a neighbor device.

For any operations performed by a device 150a . . . 150n, it is to be understood that the local grouping system 152a . . . 152n of that device 150a . . . 150n performs the operations. For any operations performed by the administrative server 100, it is to be understood that the global grouping system 110 performs the operations.

Figure 1B:
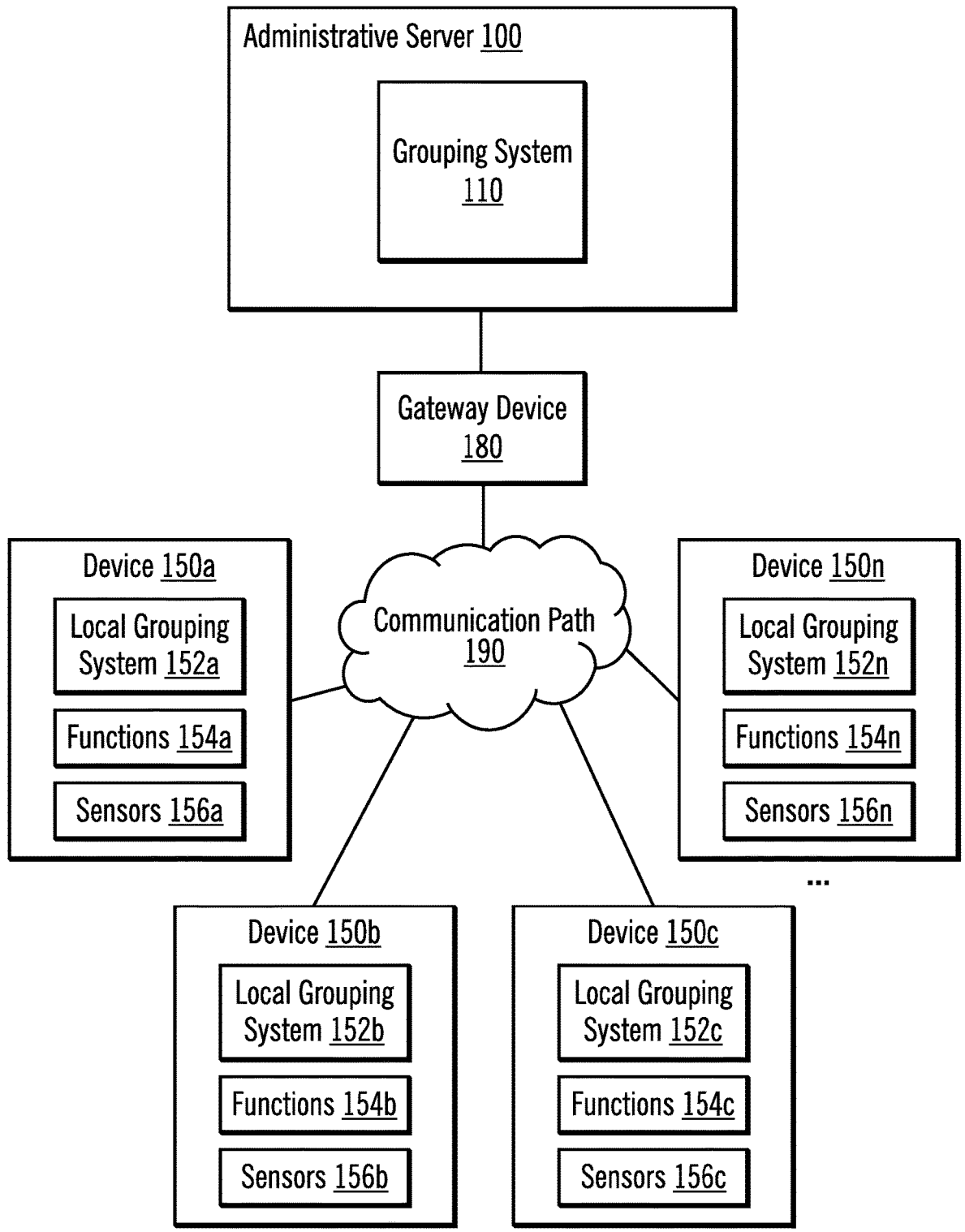
FIG. 1B illustrates, in a block diagram, an alternative computing environment that includes a gateway device in accordance with certain embodiments.

FIG. 1B illustrates, in a block diagram, an alternative computing environment that includes a gateway device in accordance with certain embodiments. In FIG. 1B, the administrative server 100 is connected to the gateway device 180, which is also connected to the devices 150a . . . 150n. In embodiments with the gateway device 180, the administrative server 100 and the devices 150a . . . 150n communicate with each other through the gateway device 180.

Embodiments allow for creation of a mutually complementary device group that is temporary. The device group may be referred to as a virtual device as the device group may act as a single device. The local grouping system 152a . . . 152n of each device 150a . . . 150n provides to the local grouping system 152a . . . 152n of each of the other devices 150a . . . 150n a list of functions 154a . . . 154n that may be provided to other devices 150a . . . 150n and functions 154a . . . 154n that the device 150a . . . 150n would like provided by the other devices 150a . . . 150n via the communication path 190.

A local grouping system 152a . . . 152n of a device 150a . . . 150n calculates an individual function usage score to determine whether to join a device group, to determine whether to remain in the device group, and to determine whether to leave the device group. In certain embodiments, if the individual function usage score exceeds a device threshold, then the device 150a . . . 150n joins the device group or remains in the device group, and, if that individual function usage score equals or is below the device usage threshold, then the device 150a . . . 150n does not join the device group or leaves the device group.

In certain embodiments, the individual function usage score of one device 150a . . . 150n takes into account both an increase in efficiency ("function usage gain") for that one device 150a . . . 150n when using a function of another device 150a . . . 150n and a decrease in efficiency ("function usage loss") for that one device 150a . . . 150n when providing a function to another device 150a . . . 150n. In certain embodiments, the local grouping system 152a . . . 152n of the device 150a . . . 150n calculates the individual function usage score by summing function usages. In certain embodiments, function usage gains have positive values or are zero (e.g., indicating minimal gain), while function usage losses have negative values or are zero (e.g., indicating minimal loss). For example, the function usage gains may be +5, while the function usage losses may be −3, and the individual function usage score is +2, which is compared to a device threshold.

In certain embodiments, a function usage gain is found when a specific function 154a . . . 154n is provided by another device 150a . . . 150n, and a function usage loss is found when a specific function 154a . . . 154n is provided to another device 150a . . . 150n.

In certain embodiments, a function 154a . . . 154n is provided to another device 150a . . . 150n without receiving a function 154a . . . 154n from the other device 150a . . . 150n. In other embodiments, a function 154a . . . 154n is received from another device 150a . . . 150n without a function 154a . . . 154n being provided to the other device 150a . . . 150n. In yet other embodiments, functions 154a . . . 154n are exchanged between the devices 150a . . . 150n.

In certain embodiments, the functions 154a . . . 154n that the device 150a . . . 150n provides to other devices 150a . . . 150n are categorized as functions 154a . . . 154n that cause function usage loss, since there may be little benefit to the device 150a . . . 150n itself and requires additional resources of the device 150a . . . 150n. In certain embodiments, any functions 154a . . . 154n that are provided by other devices 150a . . . 150n are categorized as functions 154a . . . 154n that bring function usage gain because this allows the device 150a . . . 150n to utilize resources for the device's 150a . . . 150n ("own") workloads and provides assistance to solve problems that the device 150a . . . 150n may not be able to solve independently.

In certain embodiments, the value of the function usage gain or function usage loss of a function 154a . . . 154n may be set by the local grouping system 152a . . . 15n of the device 150a . . . 150n providing the function 154a . . . 154n, may be set by the local grouping system 152a . . . 15n of the device 150a . . . 150n receiving the function or may be set based on factors (e.g., quantitative indices and function details (e.g., image resolution of in-vehicle camera, confidence level of obstacle recognition sensor, capability of platooning drive, etc.)). In addition, each device 150a . . . 150n may have a different value for a device threshold for that device 150a . . . 160n. Moreover, the device threshold may be a single value or may be a range.

A function usage gain of receiving a function 154a . . . 154n from another device 150a . . . 150n may be described as increasing efficiency of the device 150a . . . 150n based on, for example, utilizing a sensor of another device 150a . . . 150n, finding a savings in labor arising from not using a function 154a . . . 154n of the device 150a . . . 150n itself (i.e., of the own device), and finding a positive effect produced from diverting surplus resources to other functions 154a . . . 154n of the device 150a . . . 150n itself (i.e., of the own device).

A function usage loss of providing a function 154a ... 154n to another device 150a ... 150n may be described as decreasing efficiency of the device 150a ... 150n based on, for example, a reduction in speed of the sender device 150a ... 150n itself, an additional burden arising from the provision of functions 154a ... 154n (for example, increase in consumption of power and decrease in fuel efficiency of the device 150a ... 150n itself), and possibly a burden of providing a monetary reward for provision of a function 154a ... 154n (i.e., where one device 150a ... 150n is paid to provide the function to another device 150a ... 150n).

If the local grouping system 152a ... 152n of a device 150a ... 150n determines that the individual function usage score exceeds the device threshold for the sender device 150a ... 150n for a specific function 154a ... 154n provided by another device 150a ... 150n, then the local grouping system 152a ... 152n issues a request (e.g., signal, message, etc.) for generating a device group that is transmitted to one or more devices 150a ... 150n.

If the local grouping system 152a ... 152n of a receiver device 150a ... 150n receiving the request for generating a device group determines that an individual function usage score exceeds the device threshold for the receiver device 150a ... 150n for participation in the device group to provide the specific function 154a ... 154n, the local grouping system 152a ... 152n of the receiver device 150a ... 150n sends a device group generation acceptance response (e.g., signal, message, etc.) back to the local grouping system 152a ... 152n of the sender device 150a ... 150n of the request. This may occur when the receiver device 150a ... 150n is not receiving a function from another device 150a ... 150n but has an individual function usage score that still exceeds the device threshold for the receiver device 150a ... 150n (e.g., the functional usage loss may be considered minimal for that device 150a ... 150n or the value assigned to providing that function still exceeds the device threshold). Then, the sender device 150a ... 0.150n and the receiver device 150a ... 150n form a device group to act as a single virtual device, with the local grouping systems 152a ... 152n of each device 150a ... 150n in the device group collaborating and cooperating by exchanging data (e.g., camera images).

The local grouping system 152a ... 152n of the sender device 150a ... 150n that initiated creation of the device group operates as a single virtual device and may repeat the creation of a new device group with other devices or device groups. With embodiments, a sum that includes the individual function usage score of each device 150a ... 150n in a device group may be referred to as a collective function usage score of the virtual device formed by the device group.

A device 150a ... 150n that is part of a first device group may additionally join in a second device group if that does not cause the collective function usage score to decrease such that the collective function usage score is equal to or below a device group threshold (or "collective" threshold).

Figure 2:
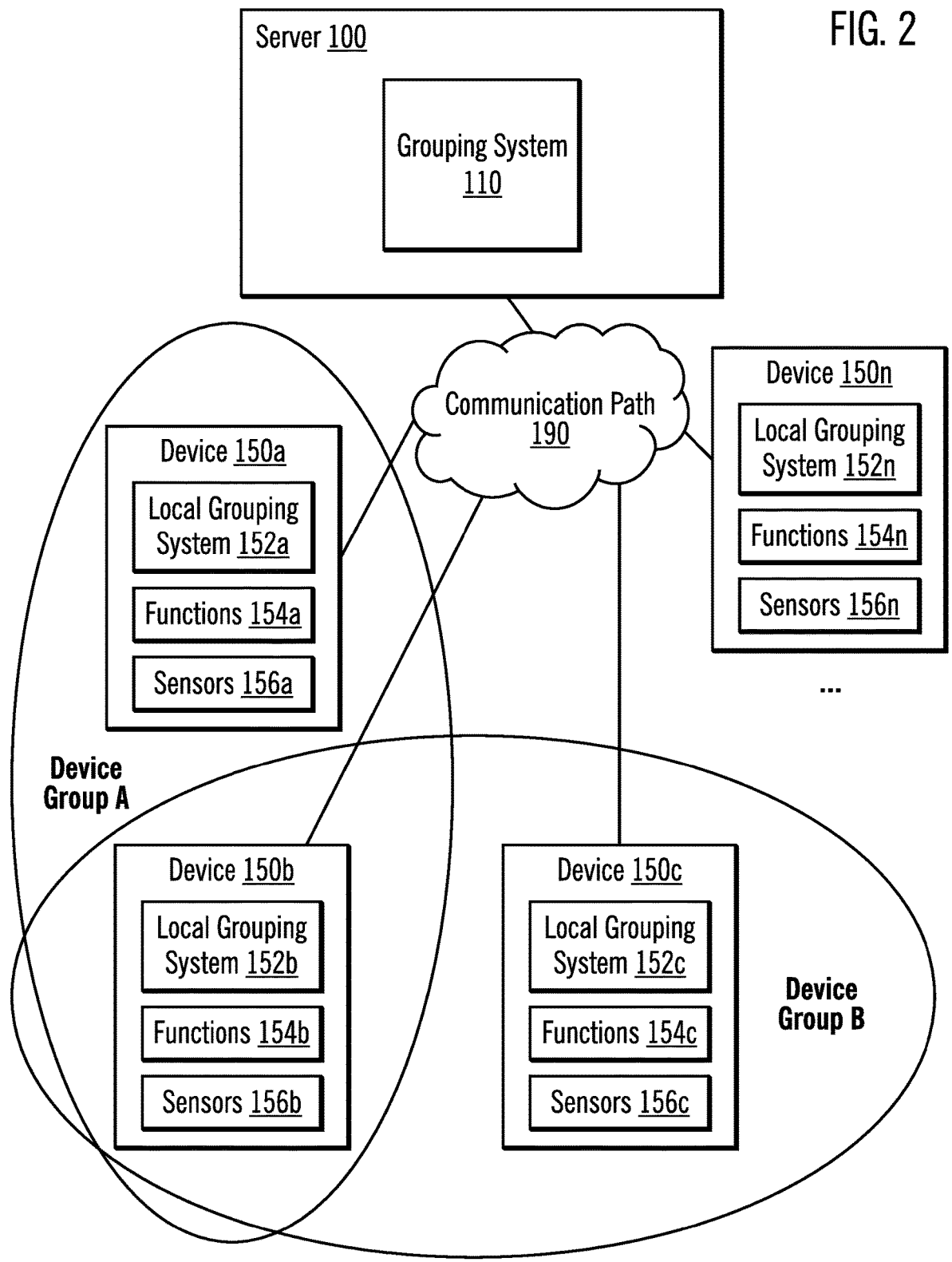
FIG. 2 illustrates, in a block diagram, an example of device grouping in accordance with certain embodiments.

FIG. 2 illustrates, in a block diagram, an example of device grouping in accordance with certain embodiments. In FIG. 2, devices 150a, 150b of device Group A work together, while devices 150b, 150c of device Group B work together.

Figure 3:
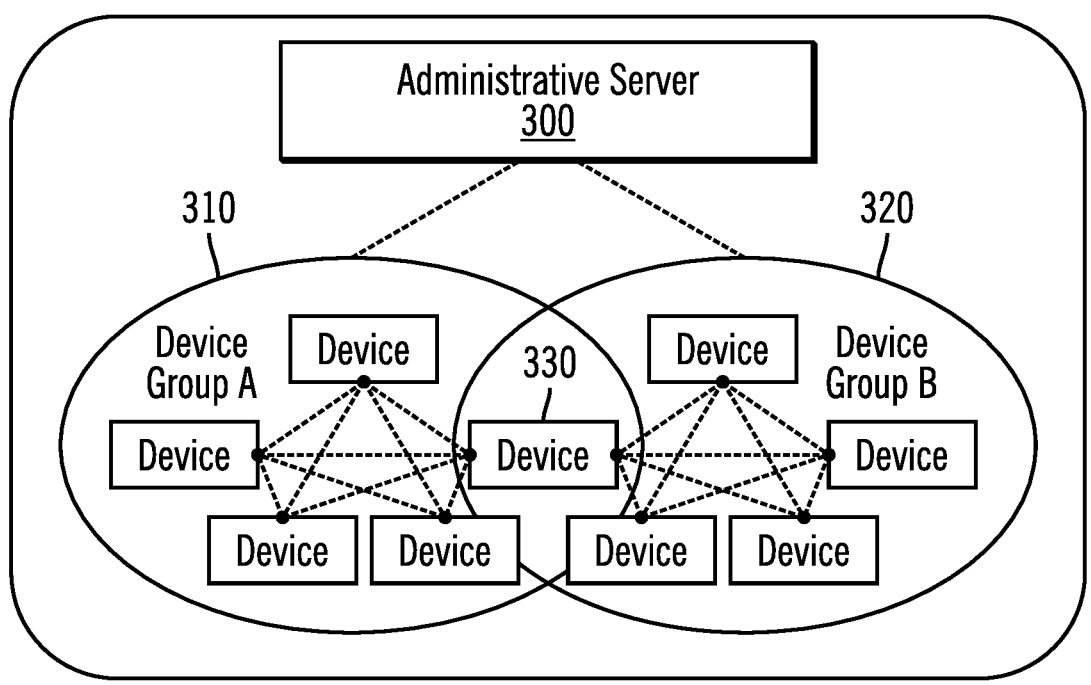
FIG. 3 illustrates, in a block diagram, another example of device grouping in accordance with certain embodiments.

FIG. 3 illustrates, in a block diagram, another example of device grouping in accordance with certain embodiments. In FIG. 3 the administrative server 300 is connected to devices in device Group A 310 and to devices in device Group B 320. The device Group A 310 and the device Group B 320 have a common device 330 that belongs to both device groups.

In certain embodiments, a device 150a ... 150n may exit a device group, which results in a reconfiguration of the device group. The device group operates as a virtual device 150a ... 150n based on the collective function usage score, on the other hand, an individual device 150a ... 150n in the device group updates an individual function usage score periodically and exits the device group if the function usage loss due to remaining in the device group equals or is below the device threshold for that device 150a ... 150n. For example, a device 150a ... 150n may leave a device group when being in the device group results in a delay of local processing at that device 150a ... 150n that is not acceptable.

When a specific device 150a ... 150n exits the device group, functions among the devices 150a ... 150n remaining in the device group may be reconfigured. The reconfiguration includes exchanging of mutual complementary functions and may include the rearrangement of the devices 150a ... 150n remaining in the device group (e.g., for devices in vehicles of a convoy, the vehicles may form a new configuration with a vehicle up front moving to the back of the convoy). As a result of the reconfiguration, another device 150a ... 150n may exit the device group based on an individual function usage score or a new device 150a ... 150n may join the device group based on an individual function usage score.

In certain embodiments, the devices 150a ... 150n and device groups cooperate with the administrative server 100. The administrative server 100 may be notified in advance that a candidate device 150a ... 150n may be joining a device group by an intentional detour (e.g., a device in a vehicle causes the vehicle to take a detour from a path to join the device group), that a candidate device 150a ... 150n may decrease or increase speed (e.g., a device in a vehicle that is travelling faster or slower may join the device group), and that a candidate device 150a ... 150n is in standby mode (during which the candidate device 150a ... 150n waits for another device 150a ... 150n that is able to provide a desired function to be available (e.g., physically passing nearby) so that the candidate device 150a ... 150n may form a new device group with that other device 150a ... 150n. As a consideration for unilateral provision of functions, a monetary reward, such as reduction in toll or tax may be given (e.g., which may be handled by the administrative server 100).

Thus, a plurality of devices 150a ... 150n may form a temporary device group to complement functions among devices 150a ... 150n. In certain embodiments, the device group ends when one device 150a ... 150n remains in the device group due to other devices 150a ... 150n leaving based on the individual function usage score of that device 150a ... 150n. In other embodiments, the device group may exist for a determined period of time. A device 150a ... 150n may exit a device group at any given time. A device 150a ... 150n may join one or more device groups. Devices 150a ... 150n may autonomously form a device group by coordinating with each other, without the administrative server 100. Alternatively, devices 150a ... 150n may form a device group in collaboration with the administrative server 100, and the requests to form groups and responses to those requests go through the administrative server 100.

In certain embodiments, when devices 150a ... 150n are physically far apart, the devices 150a ... 150n may use the administrative server 100 to route requests and responses. In such cases, the physically far apart devices 150a ... 150n may not be able to communicate with each other directly. In certain embodiments, when two devices 150a ... 150n are physically near each other (e.g., in the neighborhood or vicinity of each other), the devices 150a ... 150n may communicate requests and responses directly with each other to from a device group or may do so via the administrative server 100.

In embodiments in which the devices 150a ... 150n are mobile Internet of Things (IoT) devices (e.g., a device 150a ... 150n in a vehicle connected to a communication path to communicate), a problem that is difficult to solve by one of the devices 150a ... 150n or is not one that may be solved by a single device 150a ... 150n may be solved by the device 150a ... 150n temporarily collaborating with one or more other devices 150a ... 150n. These other devices 150a ... 150n may be referred to as neighbor devices.

For example, a self-driving car includes a device 150a ... 150n to determine a peripheral environment and control the self-driving car. However, the device 150a ... 150n in the self-driving car may not be able to obtain information about the peripheral environment (e.g., about other cars, pedestrians, bicycles, etc.) in a blind corner at an intersection or about a situation ahead that is blocked by a tall vehicle in front of the self-driving car. With embodiments, the device 150a ... 150n of the self-driving car requests assistance from a device 150a ... 150n of a neighboring vehicle. Then, the device 150a ... 150n of the neighboring vehicle provides the device 150a ... 150n of the self-driving car with information about the situation in the blind corner or ahead so that functions of the device 150a ... 150n of the self-driving car (e.g., ones that are not able to collect the desired data) are complemented by the functions of the device 150a ... 150n of the neighboring vehicle and the device 150a ... 150n of the self-driving car is able to continue the self-driving operation.

In many cases, a device 150a ... 150n (e.g., an individual mobile IoT device) of a vehicle operates autonomously and is able to collect information on: destinations, travel speeds, types of operating sensors, and capacity of resources available of the vehicle. However, embodiments, enable the device 150a ... 150n to cooperate with other devices 150a ... 150n for better performance and to obtain information that the device 150a ... 150n may not be able to obtain.

In the case of a convoy of vehicles (e.g., trucks) that are traveling together, embodiments may implement a fixed device group on the assumption that collaborative operation of the devices 150a ... 150n of the vehicles of the convoy is performed for the same purpose. In addition, embodiments enable temporarily collaborative operation of devices 150a ... 150n while functions of the devices 150a ... 150n are complemented, without hindering the purpose of operation of each of the devices 150a ... 150n where a wide variety of devices 150a ... 150n exist in a mixed state (e.g., for devices 150a ... 150n in vehicles, the mixed state may indicate that the vehicles are traveling at different speeds).

Figure 4:
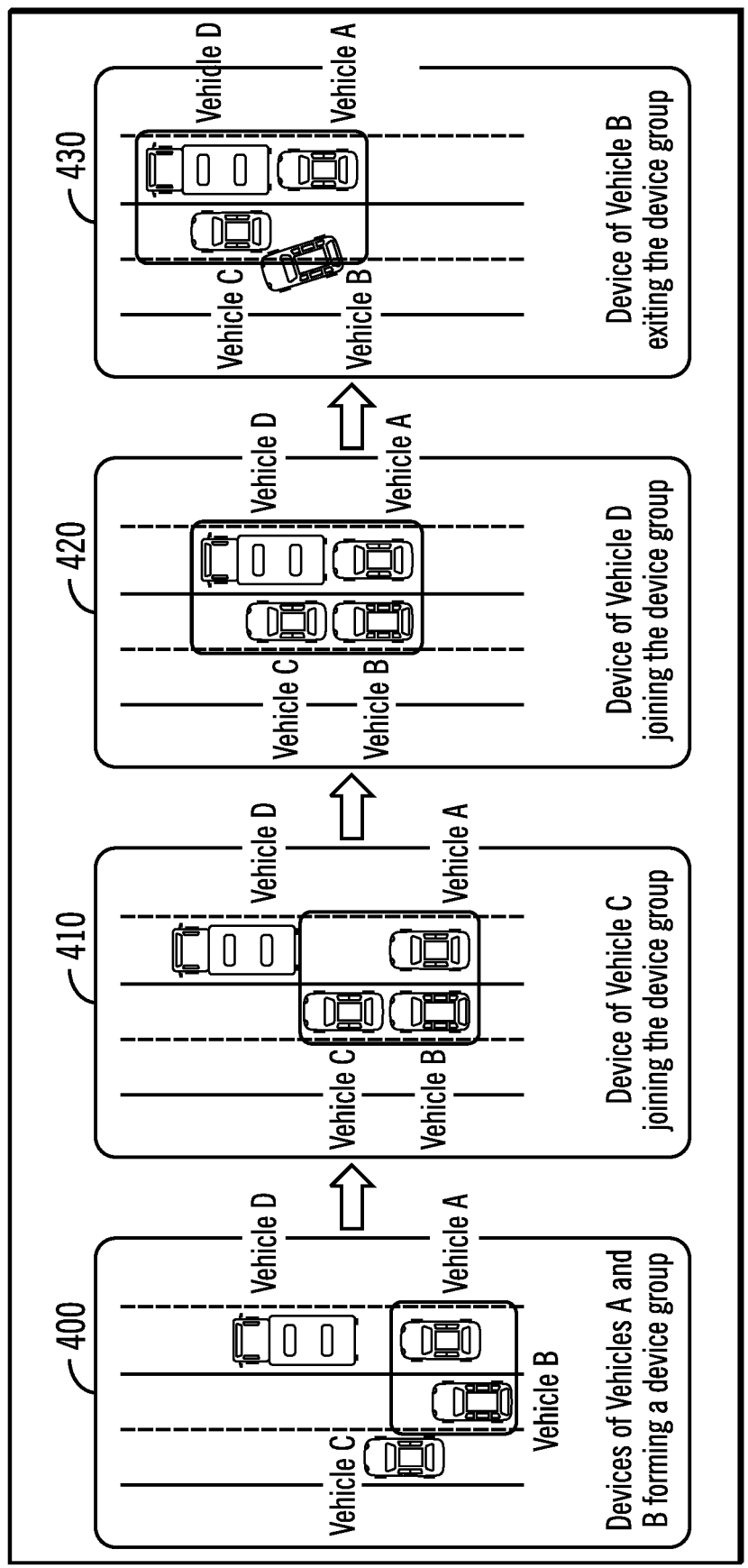
FIG. 4 illustrates an example of dynamic device group creation in accordance with certain embodiments.

FIG. 4 illustrates an example of dynamic device group creation 400 in accordance with certain embodiments. In this example, devices of Vehicle A and Vehicle B form a device group in block 400. Then, device of Vehicle C joins the device group in block 410. Next, the device of Vehicle D joins the device group in block 420. Then, the device of Vehicle B exits the device group in block 430.

In this example, device group creation is repeated while functions are mutually complemented. The dependence on a function on a sender device 150a ... 150n of a neighboring vehicle allows functions of the receiver device 150a ... 150n to be saved and surplus resources to be transferred to other functions of the receiver device 150a ... 150n. For example, the dependence of a peripheral monitor function on the sender device 150a ... 150n of another vehicle allows stopping the peripheral monitor function of the receiver device 150a ... 150n and using resources to communication functions of an entertainment system of the vehicle of the receiver device 150a ... 150n.

In certain embodiments, the receiver device 150a ... 150n may have partial dependence on a function of the sender device 150a ... 150n or may have complete dependence on the function of the sender device 150a ... 150n. For partial dependence, the receiver device 150a ... 150n of a vehicle may use some of the functions provided by sender devices 150a ... 150n of other vehicles (e.g., camera images taken by a neighboring vehicle), while also using its own function (e.g., also using own camera to generate camera images while a view is partially blocked) and continuing autonomous driving. On the other hand, the receiver device 150a ... 150n of the vehicle may completely depend on the function of a sender device 150a ... 150n of another vehicle (e.g., using the camera images of the sender device 150a ... 150n of the other vehicle) and follow the other vehicle without detecting the surrounding situation itself (e.g., without using its own camera).

With embodiments, based on the individual function usage score, the device 150a ... 150n may exit the device group.

There may be an increase in delay due to reduction in speed and detour. For example, when a device 150a ... 150n of a relatively fast moving vehicle forms a device group with a device 150a ... 150n of a relatively slow moving vehicle, then the device 150a ... 150n of the relatively fast moving vehicle slows down that relatively fast moving vehicle to the speed of the relatively slow moving vehicle.

Although the device 150a ... 150 n may obtain some benefit by forming a device group, the individual function usage score also takes into account any disadvantages.

Figure 5:
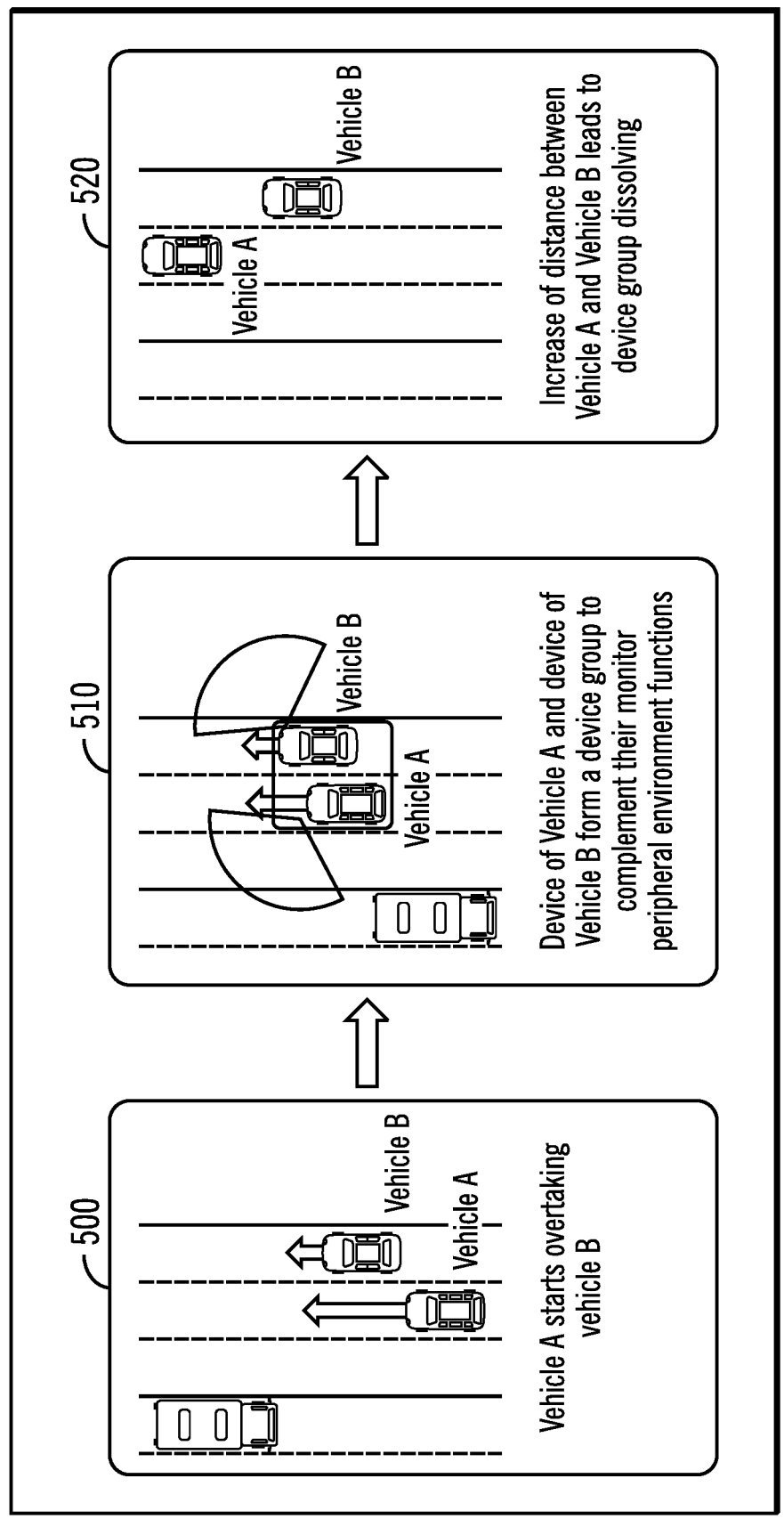
FIG. 5 illustrates an example of functional complementation in accordance with certain embodiments.

FIG. 5 illustrates an example of functional complementation in accordance with certain embodiments. In block 500, Vehicle A overtakes Vehicle B. The peripheral monitor function of the device of Vehicle A recognizes that it lacks the ability to obtain data on a portion of the environment. The peripheral monitor function of the device of Vehicle B recognizes that it lacks the ability to obtain data on a portion of the environment. In light of this, in block 510, the devices of Vehicle A and Vehicle B form a temporary device group and integrate the peripheral monitor functions and share data on the peripheral environment. In particular, the device of Vehicle A monitors the left side, while the device of Vehicle B monitors the right side, to mutually complement the peripheral monitor function. In block 520, there is an increase of distance between Vehicle A and Vehicle B, which results in the device group dissolving automatically based on the individual function usage scores.

Figure 6:
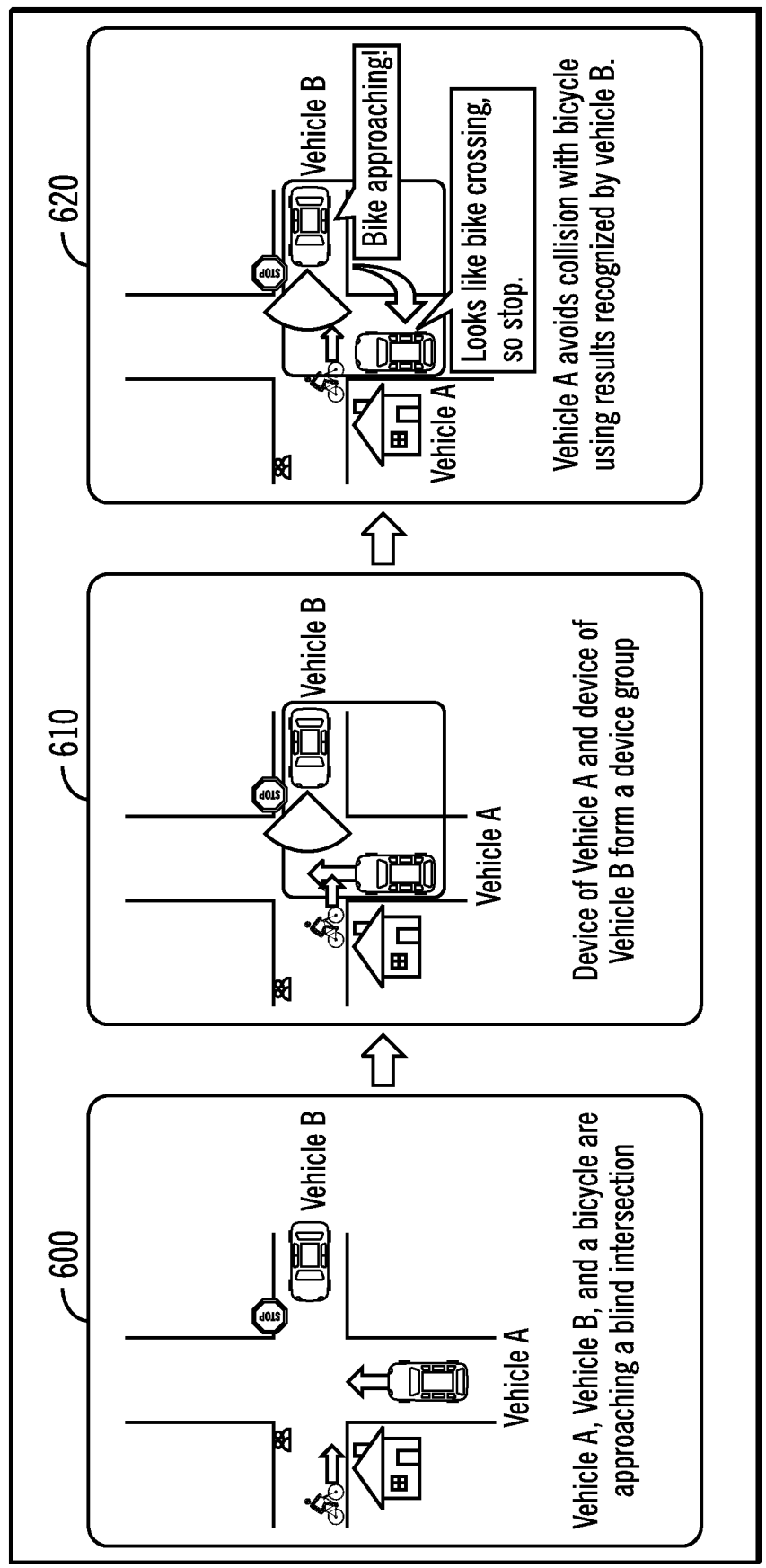
FIG. 6 illustrates another example of functional complementation in accordance with certain embodiments

FIG. 6 illustrates another example of functional complementation in accordance with certain embodiments. In block 600, Vehicle A, Vehicle B, and a bicycle are approaching a blind intersection (where a house makes it difficult for Vehicle A to see the bicycle). In block 610, the device of Vehicle A and the device of Vehicle B form a device group via the administrative server 100, which knows that the intersection has a blind spot and knows that the two vehicles are approaching this area by continuously monitoring their positions and notifying Vehicle A and Vehicle B that forming a device group may provide complementary functions. In this case, the device of Vehicle A does not yet detect the bicycle at the blind corner, but the device of vehicle B detects the bicycle through a camera. In block 620, because the device of Vehicle A receives information from the device of Vehicle B about the bicycle, Vehicle A avoids a collision with the bicycle. The sharing of data between the devices in the device group also prevents Vehicle A and Vehicle B from colliding with each other.

Figure 7:
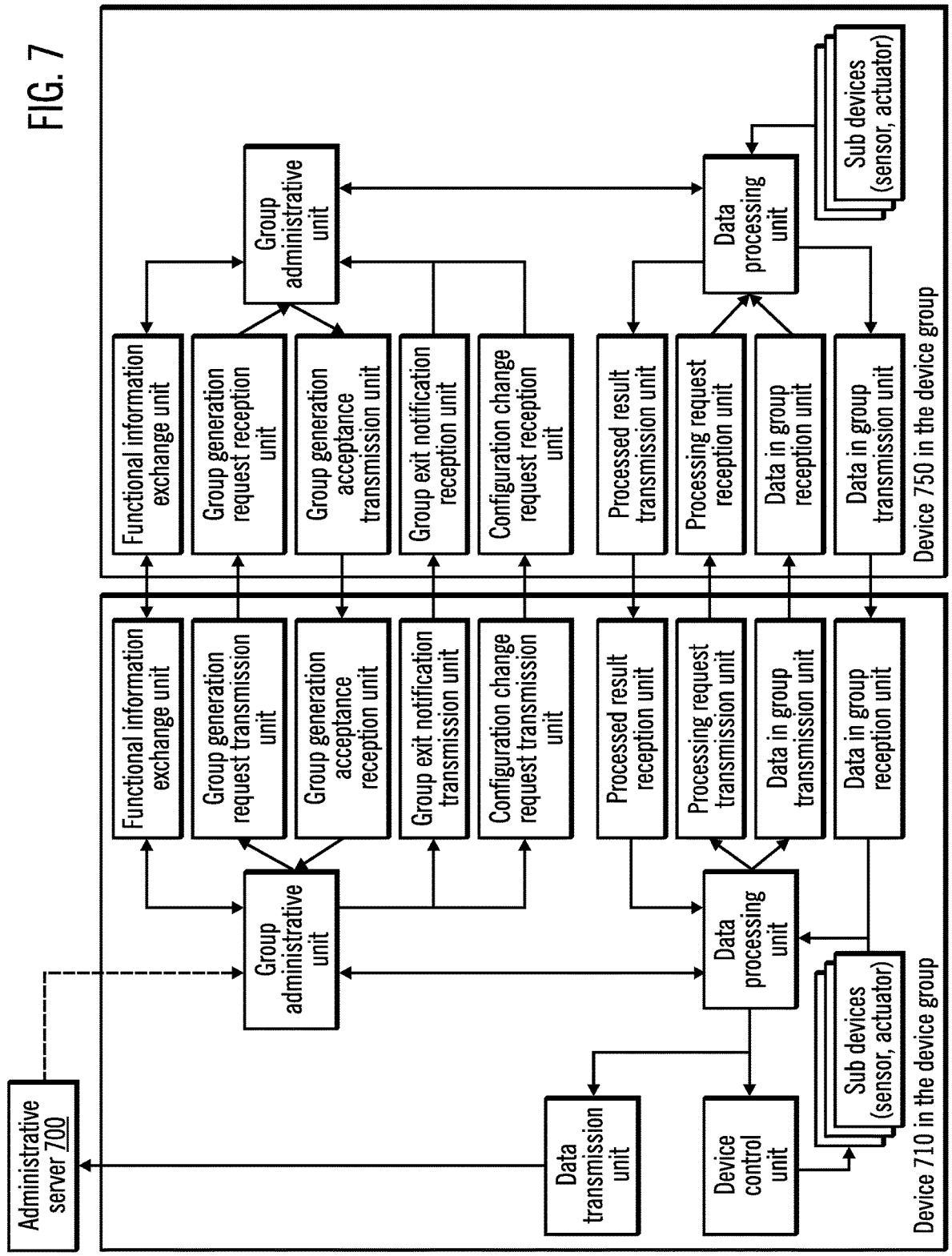
FIG. 7 illustrates, in a block diagram, components of a device in accordance with certain embodiments.

FIG. 7 illustrates, in a block diagram, components of a device in accordance with certain embodiments. In FIG. 7, an administrative server 700 is connected to a device group that includes device 710 and device 750. There may be additional devices in the device group, and each of the devices may have the same or different units as shown in devices 710 and 750. Also, example units are shown in devices 710 and 750. In other embodiments, there may be other units included, fewer units or a different combination of units. Also, each of the devices 710, 750 may include functions that may be shared, in addition to any data that is obtained via the sub-devices. The units of a device working together may be described as a local grouping system 152a . . . 152n.

The sub-devices of devices 710, 750 may include sensors, an actuator, a camera, etc. The data processing unit of device 710 processes sensor data of the sensors, instructs the device control unit to control an actuator, and transmits processing results to the administrative server 700 via the data transmission unit in accordance with procedures for predetermined processing. The data processing unit of device 750 receives data from the sub-devices and sends that data to device 710.

The functional information exchange unit of devices 710, 750 exchange information on functions that may be provided by that device and that are desired to be provided from the other device.

The group administrative unit of device 710 transmits a group generation request to other devices via the group generation request transmission unit of device 710 for a function (e.g., according to a peripheral situation) determined by the data processing unit or types of functions that may be provided by the other devices.

When the group generation request reception unit of device 750 receives a group generation request, the group administrative unit of device 750 determines whether to join the device group. If acceptance is made, an acceptance response is sent via the group generation acceptance transmission unit of device 750 to the group generation acceptance reception unit of device 710.

The group administrative unit of devices 710, 750 on both sides instruct subordinate data processing functions to perform functional complementation between devices in the device group (e.g., transmission and reception of data and sharing of data process results), thereby, to perform mutual functional complementation via the data-in-group reception units, the data-in-group transmission units, the processed result reception unit, the processing request transmission unit, the processed result transmission unit, and the processing request reception unit.

The group administrative unit of devices 710, 750 further transmits an exit notification to the device group via the group exit notification transmission unit (e.g., according to needs depending on change in a peripheral situation).

If a configuration change of the functional complementation between devices 710, 750 is needed when a device exits or newly joins the device group, the configuration change is requested of another device in the device group via the configuration change request transmission unit.

In certain embodiments, the administrative server 700 may notify specific devices of a situation where a device group entry candidate device is approaching. Furthermore, the administrative server 700 may relay the group generation request transmitted to a device group entry candidate device according to an approaching situation. The administrative server 700 may give a device owner a monetary reward obtained by providing another device with functions.

Figure 8:
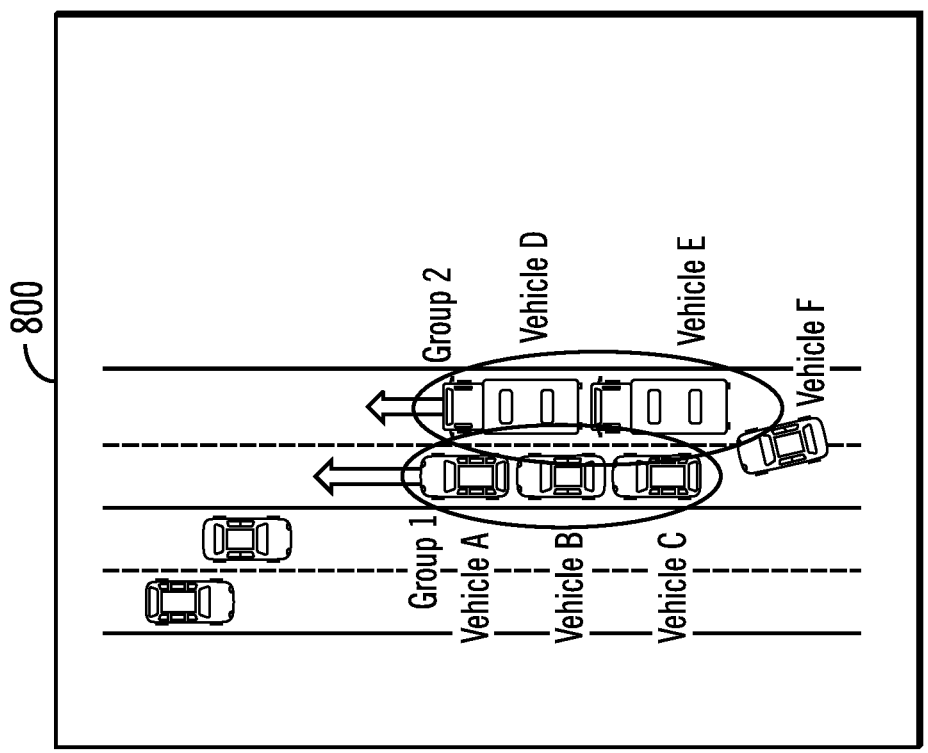
FIG. 8 illustrates an example of roles divided by sharing functions of two device groups in accordance with certain embodiments.

FIG. 8 illustrates an example 800 of roles divided by sharing functions in accordance with certain embodiments. In FIG. 8, device Group 1 includes Vehicle A, Vehicle B, and Vehicle C, which form a convoy traveling by high-speed. Vehicle A is autonomously traveling using a front monitoring function. The vehicles B and C follow the front Vehicle A without front monitoring, but the devices of vehicles B and C obtain data from the front monitoring function of the device of Vehicle A. The devices of vehicles B and C share the results of side and back monitoring with the device of Vehicle A.

In FIG. 8, device Group 2 includes low-speed Vehicle D, low-speed Vehicle E, and high-speed vehicle F. Vehicle D is autonomously traveling using a front monitoring function. The vehicles E and F follow the front vehicle D without front monitoring, but the devices of vehicles E and F obtain data from the front monitoring function of the device of Vehicle D. Also, the devices of vehicles E and F share the results of side and back monitoring with the device of vehicle D.

In this example, a change in configuration is caused by integration and separation. In particular, when the vehicles of device Group 1 approach and overtake the vehicles of device Group 2, the devices of the vehicles of device Group 1 temporarily belong to the same device group as the devices of the vehicles of device Group 2, and these devices share a peripheral monitor function.

When Vehicles A, B, and C leave the Vehicles D, E, and F owing to difference in speed, the vehicles A, B, and C and the vehicles D, E, and F are separated into the original device Groups 1 and 2, respectively.

The high-speed Vehicle F may exit device Group 2 formed by the other low-speed Vehicles D and E, and then Vehicle F may join device Group 1 formed by the high-speed Vehicles A, B, and C.

Whenever a device exits or newly joins a device group, the roles of individual devices may be re-adjusted.

Figure 9:
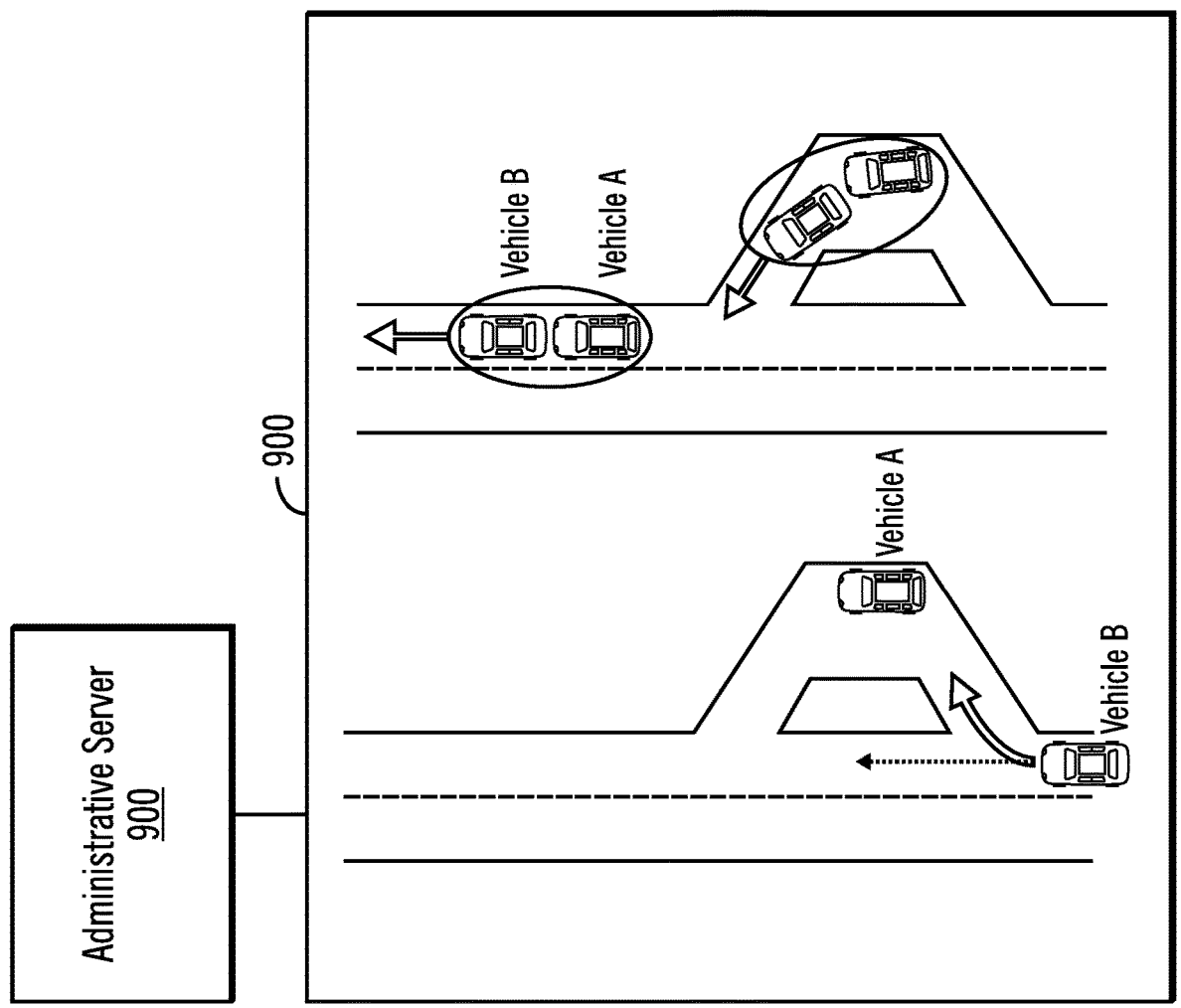
FIG. 9 illustrates an example of a function provision with reward in accordance with certain embodiments.

FIG. 9 illustrates an example 900 of a function provision with reward for devices in a device group 900 in accordance with certain embodiments. In this example, the device of Vehicle A requests a leading vehicle for convoy travelling from the administrative server 900. The administrative server 900 may notify Vehicle A of the approaching estimation time of a vehicle capable of leading. Also, the administrative server 900 may notify the device of Vehicle B of the request. Vehicle B detours to a point where the device of vehicle B joins together with the device of Vehicle A according to the request made by the device of Vehicle A.

After the device of Vehicle B joins together with the device of Vehicle A, the device of Vehicle B provides data to the device of Vehicle A, while Vehicle A and Vehicle B travel in a convoy.

In this example, Vehicle A is not able to drive at a high speed (e.g., due to problems with an automatic running function). Also, in this example, Vehicle B is a high speed vehicle with a function of leading other vehicles in addition to an automatic running function. In this example, Vehicle A forms a device group with Vehicle B.

In certain embodiments, a reward may be given to Vehicle B.

For example, as a consideration for taking a detour and leading, a toll discount, car-tax reduction, etc. may be provided to Vehicle B.

In addition, a dedicated leading vehicle may be always run as a public service (e.g., a pace maker vehicle).

Figure 10:
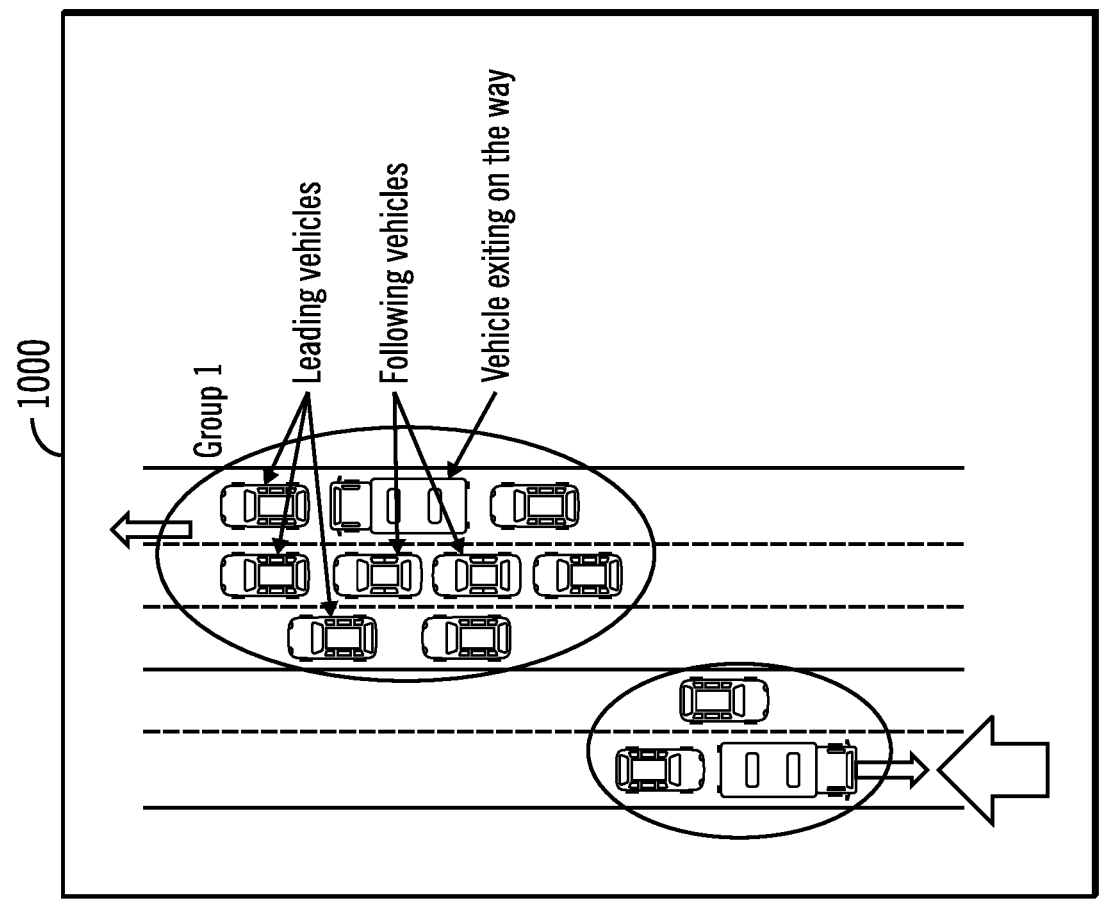
FIG. 10 illustrates an example of function optimization in accordance with certain embodiments.

FIG. 10 illustrates an example 1000 of function optimization in accordance with certain embodiments. In certain embodiments, the configuration and layout of individual devices are dynamically determined to optimize the function of the whole device group.

Embodiments provide effective convoy travelling with devices of vehicles communicating and cooperating to form a particular configuration. A leading vehicle with a high performance is put into a leading position of the convoy. A following vehicle with a low performance is put to a medium position. A vehicle scheduled to exit on the way is put to an outside lane. Moreover, configuration and layout may be dynamically changed whenever a device of a vehicle exits or newly joins a device group.

Embodiments also provide energy saving with devices of vehicles communicating and cooperating to form an energy saving configuration. A vehicle arrangement shape having small air resistance is selected with consideration of a vehicle shape. For example, a taller vehicle is arranged as a leading vehicle for the purpose of acting as a windbreaker. Consideration may be given to a vehicle suffering a disadvantage (e.g., the leading vehicle is used as a windbreaker).

Figure 11:
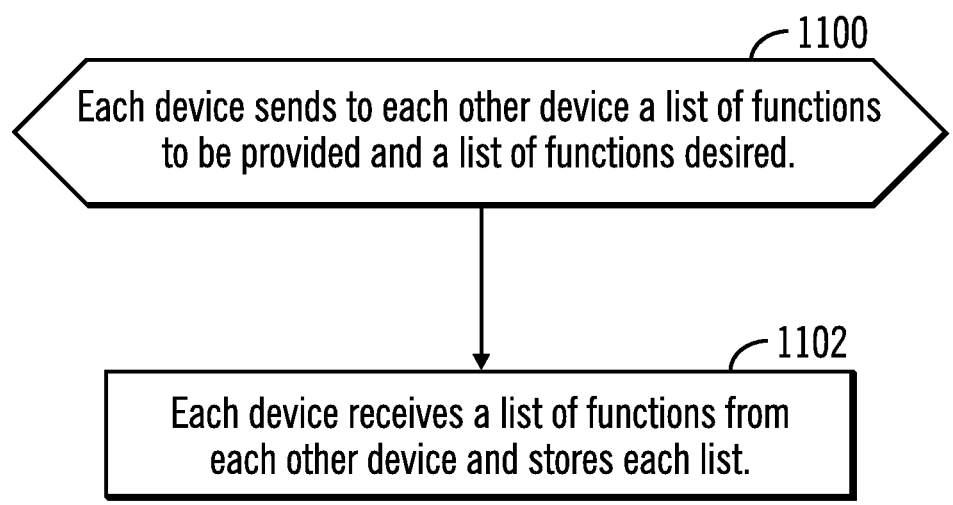
FIG. 11 illustrates, in a flowchart, operations for exchanging functions in accordance with certain embodiments.

FIG. 11 illustrates, in a flowchart, operations for exchanging functions in accordance with certain embodiments. Control begins at block 1100 with each device 150a . . . 150n sending to each other device 150a . . . 150n a list of functions to be provided and a list of functions desired. In block 1102, each device 150a . . . 150n receives a list of functions from each other device 150a . . . 150n and stores each list. In certain embodiments, each of the devices 150a . . . 150n sends the list of functions to the administrative server 100, and the administrative server 100 distributes the list of functions to each of the other devices 150a . . . 150n.

Figure 12:
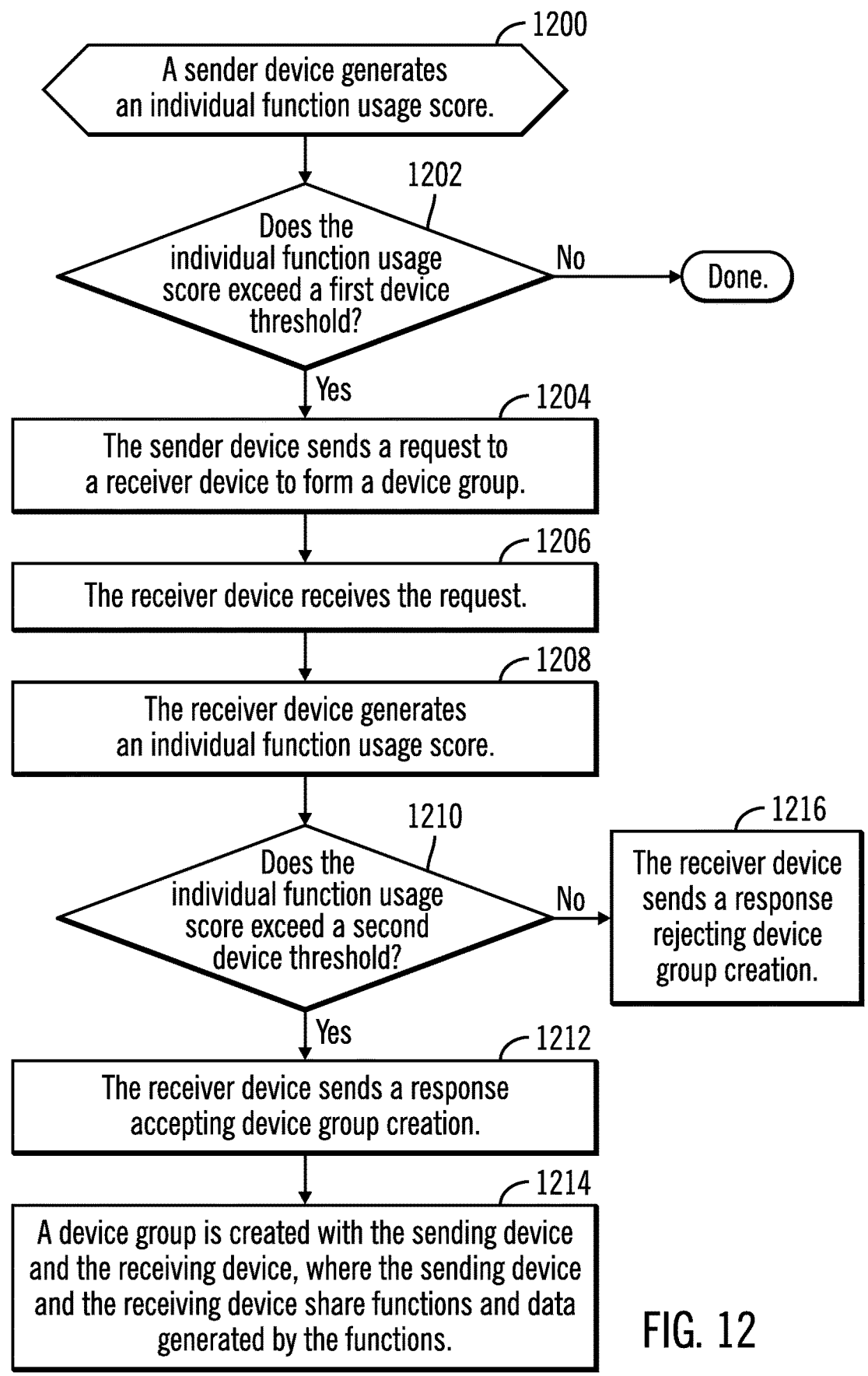
FIG. 12 illustrates, in a flowchart, operations for creating a device group in accordance with certain embodiments.

FIG. 12 illustrates, in a flowchart, operations for creating a device group in accordance with certain embodiments. Once two devices 150a . . . 150n form a device group, processing may continue to add additional devices 150a . . . 150n or other device groups to the created device group. Control begins at block 1200 with a sender device 150a . . . 150n generating an individual function usage score. In block 1202, the sender device 150a . . . 150n determines whether the individual function usage score exceeds a first device threshold. If so, processing continues to block 1204, otherwise, processing is done.

In block 1204, the sender device 150a . . . 150n sends a request to a receiver device 150a . . . 150n to form a device group. The receiver device 150a . . . 150n may be selected on the basis of the functions that the receiver device 150a . . . 150n is able to provide and that the sender device 150a . . . 150n desires to use. In block 1206, the receiver device 150a . . . 150n receives the request. In block 1208, the receiver device 150a . . . 150n generates an individual function usage score.

In block 1210, the receiver device 150a . . . 150n determines whether the individual function usage score exceeds a second device threshold. If so, processing continues to block 1212, otherwise, processing continues to block 1216. In certain embodiments, the device thresholds may be specific to a device. In certain embodiments, the first device threshold and the second device threshold are the same value, while in other embodiments, the first device threshold and the second device threshold are different values.

In block 1212, the receiver device 150a . . . 150n sends a response accepting device group creation. In block 1214, a device group is created with the sending device 150a . . . 150n and the receiver device, where the sending device 150a . . . 150n and the receiver device 150a . . . 150n share functions and data generated by the functions.

In block 1216, the receiver device 150a . . . 150n sends a response rejecting device group creation, and no device group is created.

In certain embodiments, the sender device 150a . . . 150n sends the request to the administrative server 100, and the administrative server 100 forwards the request to the receiver device 150a . . . 150n. In certain embodiments, the receiver device 150a . . . 150n sends the response to the administrative server 100, and the administrative server 100 forwards the response to the sender device 150a . . . 150n.

Figure 13:
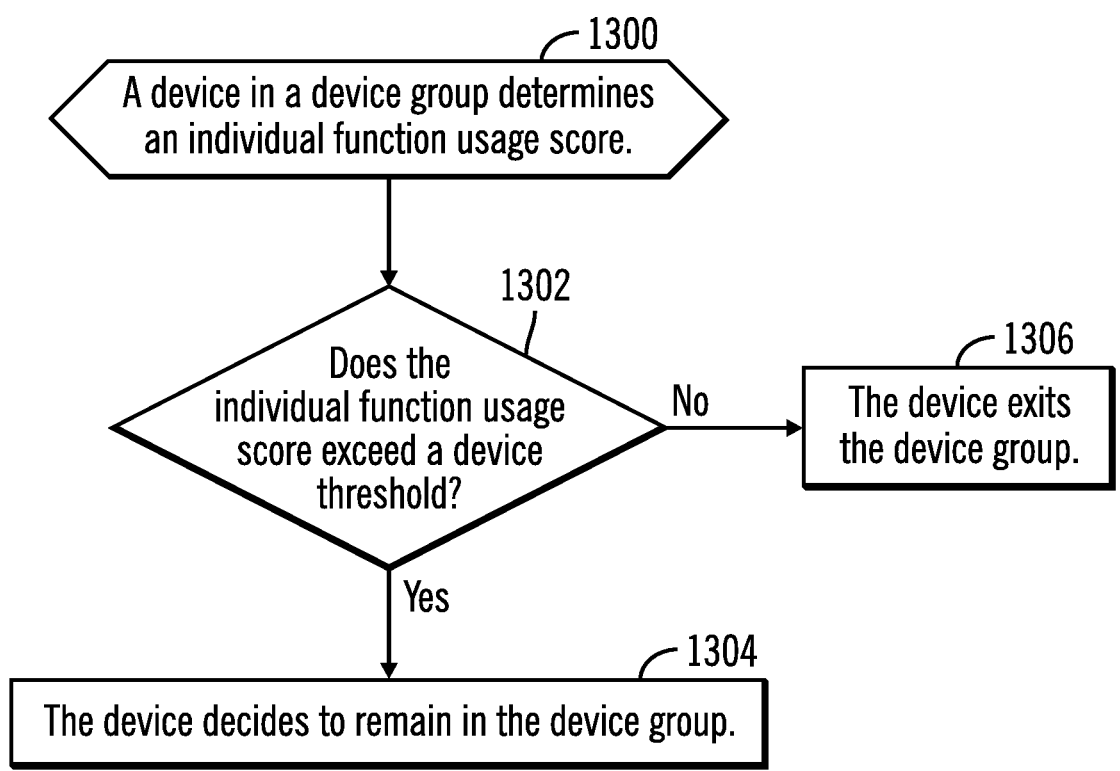
FIG. 13 illustrates, in a flowchart, operations for exiting a device group in accordance with certain embodiments.

FIG. 13 illustrates, in a flowchart, operations for exiting a device group in accordance with certain embodiments. Control begins at block 1300 with a device 150a . . . 150n in a device group determining an individual function usage score. This may be done periodically. In block 1302, the device 150a . . . 150n determines whether the individual function usage score exceeds a device threshold. If so, processing continues to block 1304, otherwise, processing continues to block 1306.

In block 1304, the device 150a . . . 150n decides to remain in the device group. In block 1306, the device 150a . . . 150n exits the device group.

Figure 14:
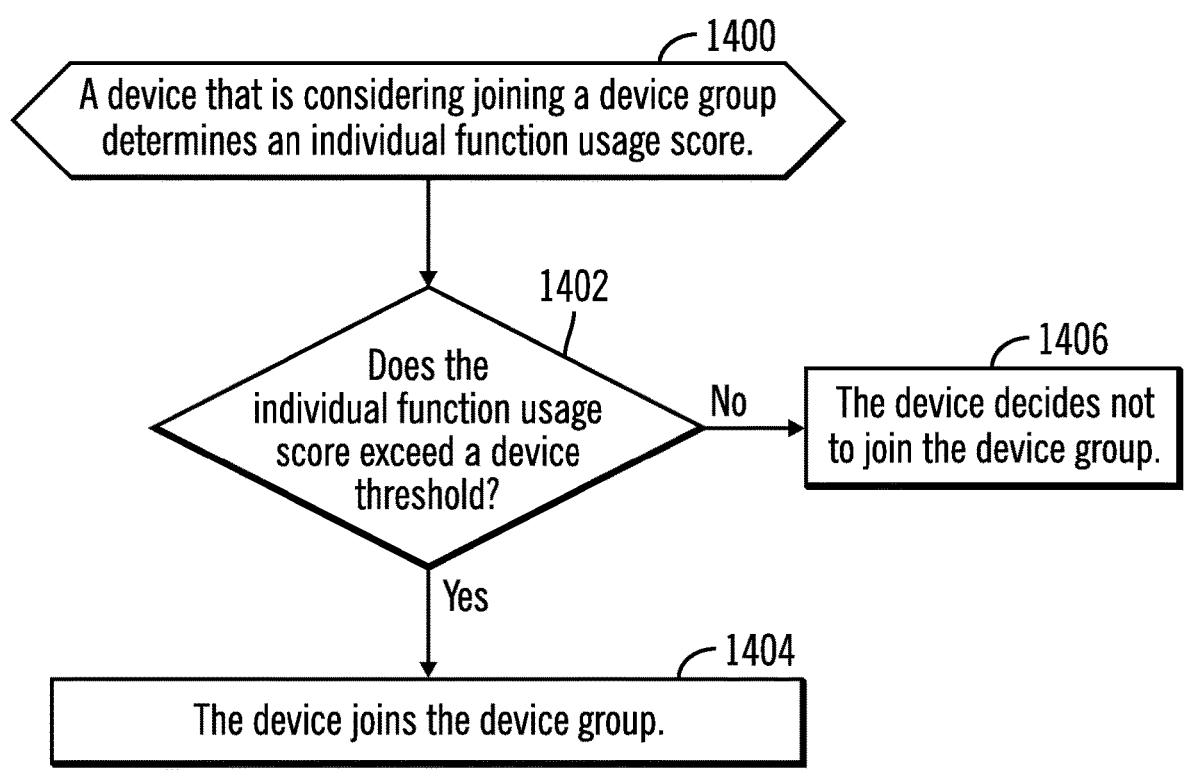
FIG. 14 illustrates, in a flowchart, operations for joining an existing device group in accordance with certain embodiments.

FIG. 14 illustrates, in a flowchart, operations for joining an existing device group in accordance with certain embodiments. Control begins at block 1400 with a device 150a . . . 150n that is considering joining a device group determining an individual function usage score. In block 1402, the device 150a . . . 150n determines whether the individual function usage score exceeds a device threshold. If so, processing continues to block 1404, otherwise, processing continues to block 1406.

In block 1404, the device 150a . . . 150n joins the device group. In block 1406, the device 150a . . . 150n decides not to join the device group.

Figure 15:
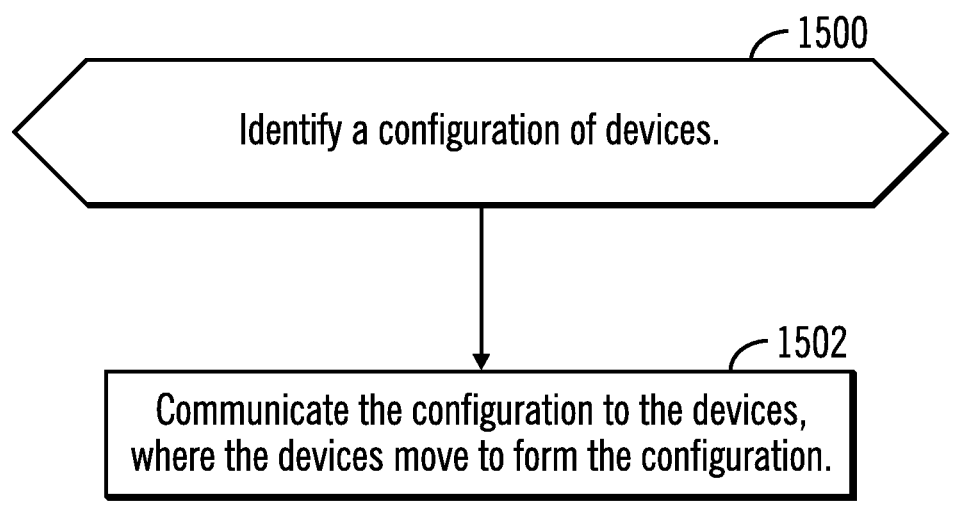
FIG. 15 illustrates, in a flowchart, operations for determining a configuration of devices in accordance with certain embodiments.

FIG. 15 illustrates, in a flowchart, operations for determining a configuration of devices 150a . . . 150n in accordance with certain embodiments. Control begins at block 1500 with either a device 150a . . . 150n or an administrative server 100 identifying a configuration of devices 150a . . . 150n. In block 1502, either the device 150a . . . 150n or the administrative server 100 communicates the configuration to the devices 150a . . . 150n, where the devices 150a . . . 150n move to form the configuration.

The devices 150a . . . 150n forming a device group may be in connected vehicles or autonomous driving vehicles. The devices 150a . . . 150n forming a device group may be in drones or other moving entities.

In certain embodiments, embodiments are applicable to edge computing (with processing of data near the edge of the network), fog computing (which uses edge devices to carry out computation, storage, and communication) or osmotic computing (which supports efficient execution of IoT services and applications at the network edge).

Certain embodiments are directed to creating a device group by exchanging, by a plurality of mobile devices 150a . . . 150n, functions that the plurality of mobile devices 150a . . . 150n may provide for other devices 150a . . . 150n and functions that are desired to be provided by other devices 150a . . . 150n via a communication unit. Each individual mobile device 150a . . . 150n calculates an individual function usage score (based on energy, time, or reward) in a case where the individual mobile device 150a . . . 150n is provided with a specific function by another device 150a . . . 150n and provides a specific function for another device 150a . . . 150n (e.g., due to a change in obtaining data on the peripheral environment). A device 150a . . . 150n may transmit a request for generating a device group to a neighboring device 150a . . . 150n if it is determined that a benefit from a specific function being provided by the neighboring device 150a . . . 150n is large based on the individual function usage score. The neighboring device 150a . . . 150n may send back a response to accept generating a device group if the neighboring device 150a . . . 150n determines that a benefit of entry into the device group is large based on its own individual function usage score.

In certain embodiments, a collective function usage score is calculated for the created device group as one virtual device.

Each individual device 150a . . . 150n in the device group may recalculate the individual function usage score at given intervals and may exit from the device group based on the individual function usage score being below the device threshold.

Moreover, the device 150a . . . 150n may communicate with the administrative server 100 and receive information on other devices 150a . . . 150n, such as information on a candidate device 150a . . . 150n of an approaching vehicle that may enter the device group.

Figure 16:
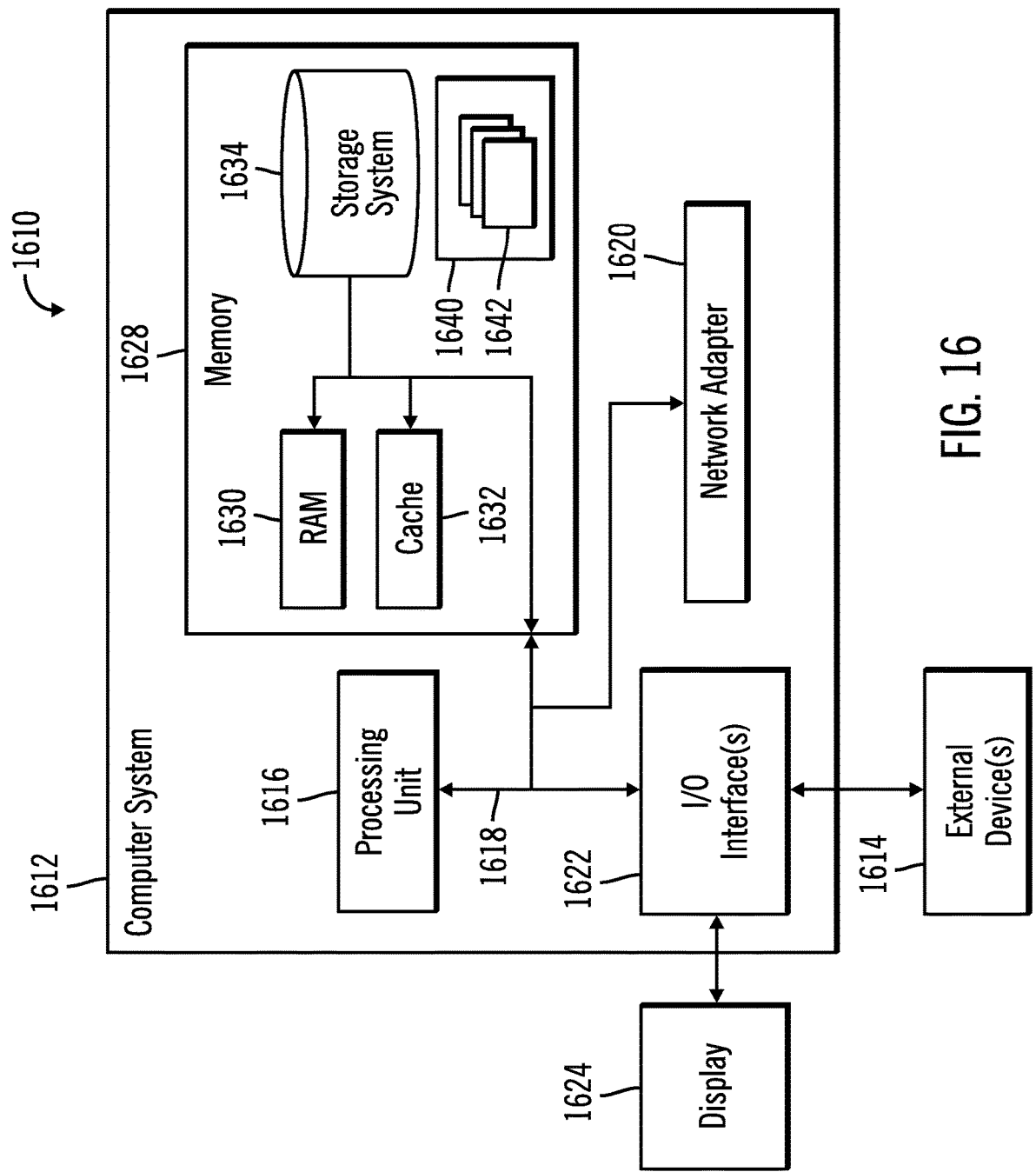
FIG. 16 illustrates a computing node in accordance with certain embodiments.

FIG. 16 illustrates a computing environment 1610 in accordance with certain embodiments. In certain embodiments, the computing environment is a cloud computing environment. Referring to FIG. 16, computer node 1612 is only one example of a suitable computing node and is not intended to suggest any limitation as to the scope of use or functionality of embodiments of the invention described herein. Regardless, computer node 1612 is capable of being implemented and/or performing any of the functionality set forth hereinabove.

The computer node 1612 may be a computer system, which is operational with numerous other general purpose or special purpose computing system environments or configurations. Examples of well-known computing systems, environments, and/or configurations that may be suitable for use with computer node 1612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1612 may be described in the general context of computer system executable instructions, such as program modules, being executed by a computer system. Generally, program modules may include routines, programs, objects, components, logic, data structures, and so on that perform particular tasks or implement particular abstract data types. Computer node 1612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer node 1612 is shown in the form of a general-purpose computing device. The components of computer node 1612 may include, but are not limited to, one or more processors or processing units 1616, a system memory 1628, and a bus 1618 that couples various system components including system memory 1628 to one or more processors or processing units 1616.

Bus 1618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1612 typically includes a variety of computer system readable media. Such media may be any available media that is accessible by computer node 1612, and it includes both volatile and non-volatile media, removable and non-removable media.

System memory 1628 can include computer system readable media in the form of volatile memory, such as random access memory (RAM) 1630 and/or cache memory 1632. Computer node 1612 may further include other removable/non-removable, volatile/non-volatile computer system storage media. By way of example only, storage system 1634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1618 by one or more data media interfaces. As will be further depicted and described below, system memory 1628 may include at least one program product having a set (e.g., at least one) of program modules that are configured to carry out the functions of embodiments of the invention.

Program/utility 1640, having a set (at least one) of program modules 1642, may be stored in system memory 1628 by way of example, and not limitation, as well as an operating system, one or more application programs, other program modules, and program data. Each of the operating system, one or more application programs, other program modules, and program data or some combination thereof, may include an implementation of a networking environment. Program modules 1642 generally carry out the functions and/or methodologies of embodiments of the invention as described herein.

Computer node 1612 may also communicate with one or more external devices 1614 such as a keyboard, a pointing device, a display 1624, etc.; one or more devices that enable a user to interact with computer node 1612; and/or any devices (e.g., network card, modem, etc.) that enable computer node 1612 to communicate with one or more other computing devices. Such communication can occur via Input/Output (I/O) interfaces 1622. Still yet, computer node 1612 can communicate with one or more networks such as a local area network (LAN), a general wide area network (WAN), and/or a public network (e.g., the Internet) via network adapter 1620. As depicted, network adapter 1620 communicates with the other components of computer node 1612 via bus 1618. It should be understood that although not shown, other hardware and/or software components could be used in conjunction with computer node 1612. Examples, include, but are not limited to: microcode, device drivers, redundant processing units, external disk drive arrays, RAID systems, tape drives, and data archival storage systems, etc.

In certain embodiments, the administrative server 100 and/or each device 150a . . . 150n has the architecture of computer node 1612. In certain embodiments, the administrative server 100 and/or each device 150a . . . 150n is part of a cloud infrastructure. In certain alternative embodiments, the administrative server 100 and/or each device 150a . . . 150n are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
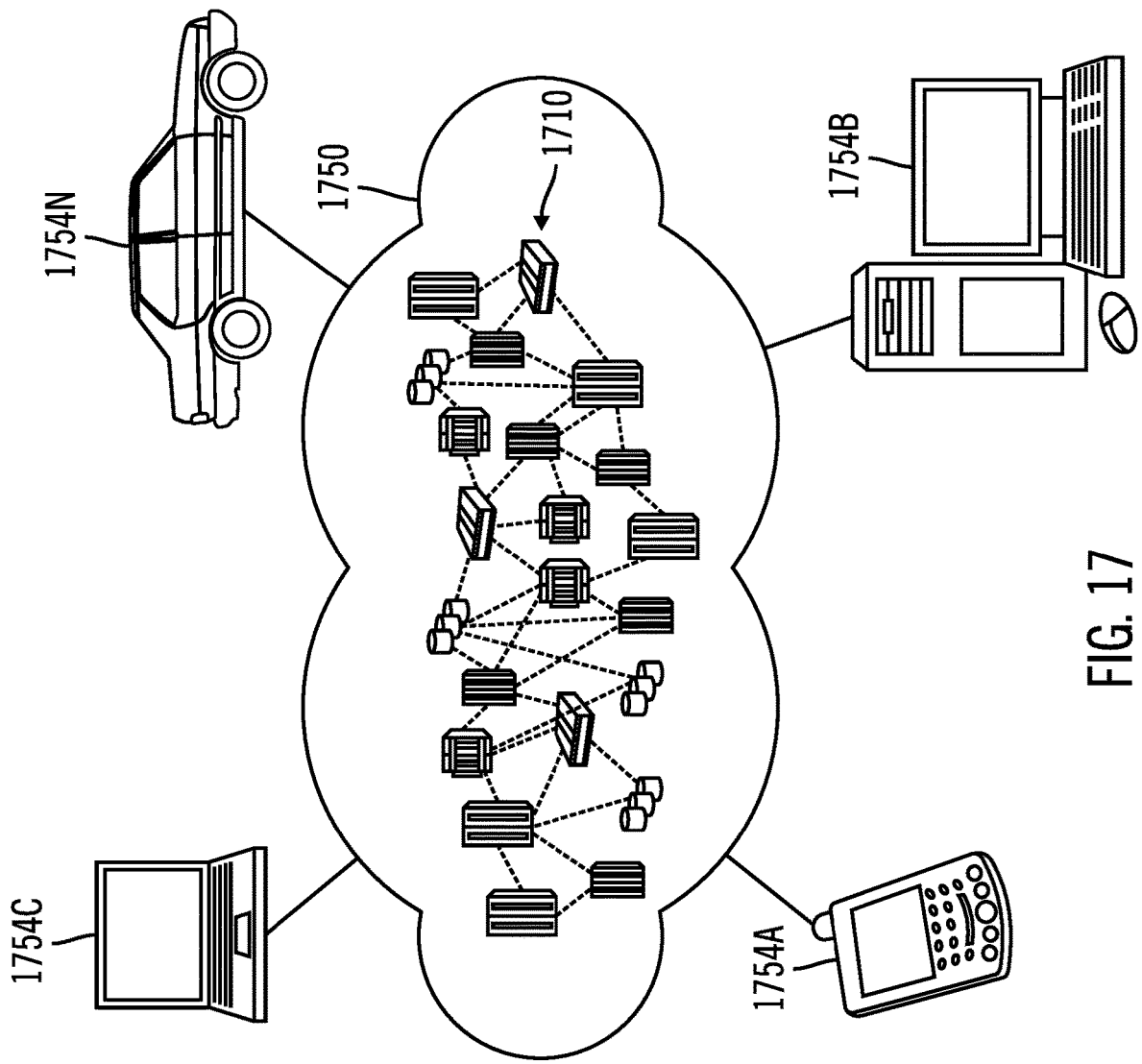
FIG. 17 illustrates a cloud computing environment in accordance with certain embodiments.

Referring now to FIG. 17, illustrative cloud computing environment 1720 is depicted. As shown, cloud computing environment 1720 includes one or more cloud computing nodes 1710 with which local computing devices used by cloud consumers, such as, for example, personal digital assistant (PDA) or cellular telephone 1754A, desktop computer 1754B, laptop computer 1754C, and/or automobile computer system 1754N may communicate. Nodes 1710 may communicate with one another. They may be grouped (not shown) physically or virtually, in one or more networks, such as Private, Community, Public, or Hybrid clouds as described hereinabove, or a combination thereof. This allows cloud computing environment 1720 to offer infrastructure, platforms and/or software as services for which a cloud consumer does not need to maintain resources on a local computing device. It is understood that the types of computing devices 1754A-N shown in FIG. 17 are intended to be illustrative only and that computing nodes 1710 and cloud computing environment 1720 can communicate with any type of computerized device over any type of network and/or network addressable connection (e.g., using a web browser).

Figure 18:
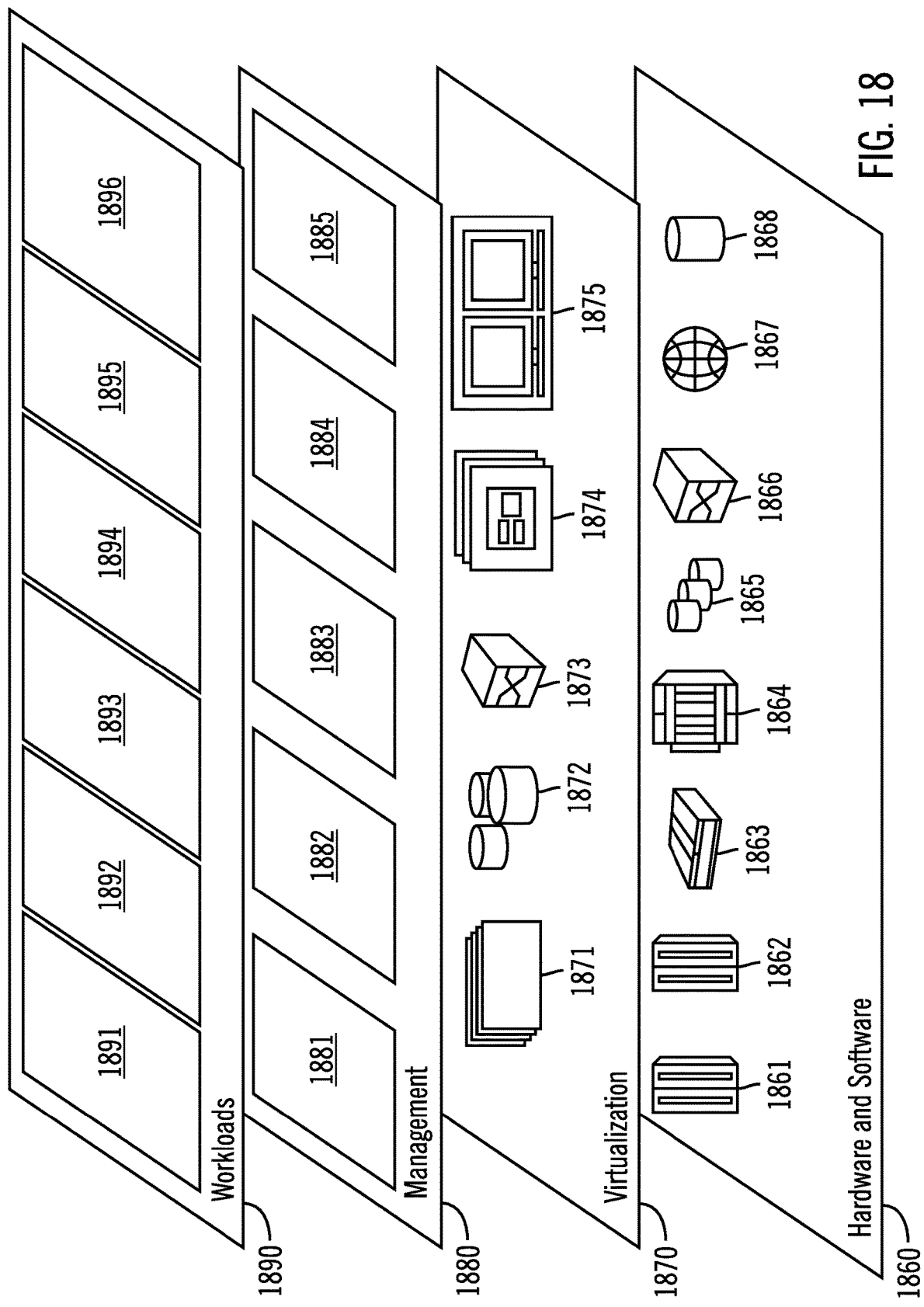
FIG. 18 illustrates abstraction model layers in accordance with certain embodiments.

Referring now to FIG. 18, a set of functional abstraction layers provided by cloud computing environment 1720 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1860 includes hardware and software components. Examples of hardware components include: mainframes 1861; RISC (Reduced Instruction Set Computer) architecture based servers 1862; servers 1863; blade servers 1864; storage devices 1865; and networks and networking components 1866. In some embodiments, software components include network application server software 1867 and database software 1868.

Virtualization layer 1870 provides an abstraction layer from which the following examples of virtual entities may be provided: virtual servers 1871; virtual storage 1872; virtual networks 1873, including virtual private networks; virtual applications and operating systems 1874; and virtual clients 1875.

In one example, management layer 1880 may provide the functions described below. Resource provisioning 1881 provides dynamic procurement of computing resources and other resources that are utilized to perform tasks within the cloud computing environment. Metering and Pricing 1882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1883 provides access to the cloud computing environment for consumers and system administrators. Service level management 1884 provides cloud computing resource allocation and management such that required service levels are met. Service Level Agreement (SLA) planning and fulfillment 1885 provide pre-arrangement for, and procurement of, cloud computing resources for which a future requirement is anticipated in accordance with an SLA.

Workloads layer 1890 provides examples of functionality for which the cloud computing environment may be utilized. Examples of workloads and functions which may be provided from this layer include: mapping and navigation 1891; software development and lifecycle management 1892; virtual classroom education delivery 1893; data analytics processing 1894; transaction processing 1895; and organizing a temporary device group for collaborative computing 1896.

Thus, in certain embodiments, software or a program, implementing organizing a temporary device group for collaborative computing in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:

storing, in each of the plurality of devices, a list of functions for each of the plurality of devices, wherein the list of functions includes functions that can be provided by each of the plurality of devices and functions desired by each of the plurality of devices;

determining, by at least one sender device, to form a device group including a receiver device from the plurality of devices, wherein the receiver device will perform at least one of the functions desired by the at least one sender device;

generating, by the at least one sender device, an individual function usage score indicating a summation between a function usage gain and a function usage loss for the list of functions;

in response to the individual function usage score exceeding a device threshold, sending, by the at least one sender device, a request to form a device group to the receiver device;

generating, by the receiver device, a second individual function usage score;

in response to the second individual function usage score exceeding a second device threshold, sending by the receiver device, an acceptance of the device group formation to the at least one sender device; and in response to receiving the acceptance of the device group formation from the receiving device, forming, by the at least one sender device, the device group for a temporary period, where functions and data are shared in the device group.

2. The computer-implemented method of claim 1, wherein the operations further comprise:
periodically determining, by at least one device in the device group, a new individual function usage score; and
in response to the new individual function usage score not exceeding the device threshold, exiting, by the at least one device, the device group.

3. The computer-implemented method of claim 1, wherein a new device of the plurality of devices joins the device group based on generating another individual function usage score.

4. The computer-implemented method of claim 1, wherein a device of the plurality of devices joins a plurality of device groups.

5. The computer-implemented method of claim 1, wherein the at least one sender device and the receiver device communicate with each other via an administrative server.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:
storing, in each of a plurality of devices, a list of functions for each of the plurality of devices, wherein the list of functions includes functions that can be provided by each of the plurality of devices and functions desired by each of the plurality of devices;
determining, by at least one sender device, to form a device group including a receiver device from the plurality of devices, wherein the receiver device will perform at least one of the functions desired by the at least one sender device;
generating, by the at least one sender device, an individual function usage score indicating a summation between a function usage gain and a function usage loss for the list of functions;
in response to the individual function usage score exceeding a device threshold, sending, by the at least one sender device, a request to form a device group to the receiver device;
generating, by the receiver device, a second individual function usage score;
in response to the second individual function usage score exceeding a second device threshold, sending, by the receiver device, an acceptance of the device group formation; and
in response to receiving the acceptance of the device group formation from the receiving device, forming, by the at least one sender device, the device group for a temporary period, where functions and data are shared in the device group.

8. The computer program product of claim 7, wherein the program code is executable by at least one processor to perform operations for:
periodically determining, by at least one device in the device group, a new individual function usage score; and
in response to the new individual function usage score not exceeding the device threshold, exiting, by the at least one device, the device group.

9. The computer program product of claim 7, wherein a new device of the plurality of devices joins the device group based on generating another individual function usage score.

10. The computer program product of claim 7, wherein a device of the plurality of devices joins a plurality of device groups.

11. The computer program product of claim 7, wherein the at least one sender device and the receiver device communicate with each other via an administrative server.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
storing, in each of a plurality of devices, a list of functions for each of the plurality of devices, wherein the list of functions includes functions that can be provided by each of the plurality of devices and functions desired by each of the plurality of devices;
determining, by at least one sender device, to form a device group including a receiver device from the plurality of devices, wherein the receiver device will perform at least one of the functions desired by the at least one sender device;
generating, by the at least one sender device, an individual function usage score indicating a summation between a function usage gain and a function usage loss for the list of functions;
in response to the individual function usage score exceeding a device threshold, sending, by the at least one sender device, a request to form a device group to the receiver device;
generating, by the receiver device, a second individual function usage score;
in response to the second individual function usage score exceeding a second device threshold, sending by the receiver device, an acceptance of the device group formation; and
in response to receiving the acceptance of the device group formation from the receiving device, forming, by the at least one sender device, the device group for a temporary period, where functions and data are shared in the device group.

14. The computer system of claim 13, wherein the operations further comprise:
periodically determining, by at least one device in the device group, a new individual function usage score; and
in response to the new individual function usage score not exceeding the device threshold, exiting, by the at least one device, the device group.

15. The computer system of claim 13, wherein a new device of the plurality of devices joins the device group based on generating another individual function usage score.

16. The computer system of claim 13, wherein a device of the plurality of devices joins a plurality of device groups.

17. The computer system of claim 13, wherein a Software as a Service (SaaS) is configured to perform the operations of the computer system.

\* \* \* \* \*